US012772113B2

(12) United States Patent
Liu et al.

(10) Patent No.: US 12,772,113 B2
(45) Date of Patent: Oct. 20, 2026

(54) PROPAGATION DELAY COMPENSATION FOR LIMITED BAND COMMUNICATIONS

(71) Applicant: QUALCOMM Incorporated, San Diego, CA (US)

(72) Inventors: Le Liu, San Jose, CA (US); Alberto Rico Alvarino, San Diego, CA (US); Sebastian Speicher, Wallisellen (CH); Bharat Shrestha, San Diego, CA (US); Sherif Elazzouni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 18/314,013

(22) Filed: May 8, 2023

(65) Prior Publication Data

US 2024/0381182 A1 Nov. 14, 2024

(51) Int. Cl.
*H04W 28/20* (2009.01)
*H04L 5/00* (2006.01)
*H04W 28/02* (2009.01)

(52) U.S. Cl.
CPC ........... *H04W 28/20* (2013.01); *H04L 5/0048* (2013.01); *H04W 28/0236* (2013.01)

(58) Field of Classification Search
None
See application file for complete search history.

(56) References Cited

U.S. PATENT DOCUMENTS

2017/0367110 A1 12/2017 Li et al.
2021/0345272 A1* 11/2021 Chatterjee ............. H04W 80/02
2022/0015019 A1 1/2022 Park
2022/0200695 A1* 6/2022 Ren ..................... H04W 56/004
(Continued)

FOREIGN PATENT DOCUMENTS

WO WO-2022031272 A1 2/2022

OTHER PUBLICATIONS

International Search Report and Written Opinion—PCT/US2024/025177—ISA/EPO—Sep. 27, 2024.
(Continued)

*Primary Examiner* — Hassan A Phillips
*Assistant Examiner* — Gautam Sharma
(74) *Attorney, Agent, or Firm* — Holland & Hart LLP/QUALCOMM Incorporated

(57) ABSTRACT

Methods, systems, and devices for wireless communication are described. In some examples a user equipment (UE) may transmit a message indicative of a capability of the UE to perform one or more propagation delay compensation (PDC) operations for limited band communications. In such examples, the limited band communications may be associated with communications via a carrier having a carrier bandwidth below a threshold bandwidth and the limited band communications may be associated with a link budget for a clock synchronization service. Such PDC operations may include a timing advance (TA) based PDC operation, a round trip time (RTT) based PDC operation, or both. The UE may receive a unicast control message that indicates a PDC operation of the one or more PDC operations for the limited band communications by the UE. In accordance with the unicast control message, the UE may perform the PDC operation for the limited band communications.

38 Claims, 19 Drawing Sheets

(56) References Cited

U.S. PATENT DOCUMENTS

| | | | | |
|---|---|---|---|---|
| 2023/0262635 A1* | 8/2023 | Tan | H04W 56/0045 370/350 |
| 2023/0284166 A1* | 9/2023 | Kolding | H04W 56/0015 370/503 |
| 2023/0300766 A1* | 9/2023 | Lin | H04W 56/0045 370/350 |
| 2023/0413204 A1* | 12/2023 | Babaei | H04W 56/0045 |
| 2025/0240747 A1* | 7/2025 | Zou | H04W 48/10 |
| 2025/0261147 A1* | 8/2025 | Shi | H04W 56/004 |

OTHER PUBLICATIONS

3GPP: "3rd Generation Partnership Project, Technical Specification Group Services and System Aspects, Service Requirements for cyber-physical control applications in vertical domains, Stage 1 (Release 17)", Technical Specification, 3GPP TS 22.104 V17.7.0, 3GPP Organizational Partners, Sophia Antipolis Valbonne, France, Sep. 2021, pp. 1-8.

3GPP: 3rd Generation Partnership Project, Technical Specification Group Services and System Aspects, Ran WG1 Meeting #107-e, e-Meeting, Nov. 11-19, 2021, Final Report of 3GPP TSG RAN WG1 #106b-e v1.0.0 (Online meeting, Oct. 11-19, 2021), MCC Support, pp. 1-153.

3GPP: "3rd Generation Partnership Project, Technical Specification Group Radio Access Network, Evolved Universal Terrestrial Radio Access (E-UTRA); Requirements for support of radio resource management (Release 17)", Technical Specification, 36.133 V17.8.0, 3GPP Organizational Partners, Sophia Antipolis Valbonne, France, Dec. 2022, pp. 1-97.

3GPP: "3rd Generation Partnership Project, Technical Specification Group Radio Access Network, NR, Requirements for support of radio resource management; (Release 17)", Technical Specification, 38.133 V17.8.0, 3GPP Organizational Partners, Sophia Antipolis Valbonne, France, Dec. 2022, pp. 1-124.

3GPP: "3rd Generation Partnership Project, Technical Specification Group Radio Access Network, NR, Physical layer procedures for data; (Release 17)", Technical Specification, 38.214 V17.4.0, 3GPP Organizational Partners, Sophia Antipolis Valbonne, France, Dec. 2022, pp. 1-8.

3GPP: "3rd Generation Partnership Project, Technical Specification Group Radio Access Network, NR, User Equipment (UE) radio access capabilities; (Release 17)", Technical Specification, 38.306 V17.3.0, 3GPP Organizational Partners, Sophia Antipolis Valbonne, France, Dec. 2022, pp. 1-18.

3GPP: "3rd Generation Partnership Project, Technical Specification Group Radio Access Network, NR, Radio Resource Control (RRC) protocol specification (Release 17)", Technical Specification, 38.311 V17.3.0, 3GPP Organizational Partners, Sophia Antipolis Valbonne, France, Dec. 2022, pp. 1-36.

3GPP: "3rd Generation Partnership Project, Technical Specification Group Radio Access Network, Evolved Universal Terrestrial Radio Access (E-UTRA); Radio Resource Control (RRC); Protocol specification (Release 17)", Technical Specification, 36.331 V17.3.0, 3GPP Organizational Partners, Sophia Antipolis Valbonne, France, Dec. 2022, pp. 1-52.

3GPP: "3rd Generation Partnership Project, Technical Specification Group Radio Access Network, Evolved Universal Terrestrial Radio Access (E-UTRA); Medium Access Control (MAC) protocol specification (Release 17)", Technical Specification, 36.321 V17.3.0, 3GPP Organizational Partners, Sophia Antipolis Valbonne, France, Dec. 2022, pp. 1-6.

3GPP: "3rd Generation Partnership Project, Technical Specification Group Radio Access Network, NR; Medium Access Control (MAC) protocol specification (Release 17)", Technical Specification, 38.321 V17.3.0, 3GPP Organizational Partners, Sophia Antipolis Valbonne, France, Dec. 2022, pp. 1-9.

3GPP: "3rd Generation Partnership Project, Technical Specification Group Radio Access Network, LTE Positioning Protocol (LPP) (Release 17)", Technical Specification, 37.355 V17.3.0, 3GPP Organizational Partners, Sophia Antipolis Valbonne, France, Dec. 2022, pp. 1-16.

* cited by examiner

PROPAGATION DELAY COMPENSATION FOR LIMITED BAND COMMUNICATIONS

INTRODUCTION

The following relates to wireless communications, including managing propagation delay compensation (PDC) in a wireless communications system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communications at a UE is described. The method may include transmitting a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service, receiving a unicast control message that indicates a PDC operation of the one or more PDC operations for the limited band communications by the UE, and performing the PDC operation for the limited band communications based on the unicast control message.

An apparatus for wireless communications at a UE is described. The apparatus may include at least one processor, at least one memory coupled with the at least one processor, and instructions stored in the at least one memory. The instructions may be executable by the at least one processor to cause the apparatus to transmit a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service, receive a unicast control message that indicates a PDC operation of the one or more PDC operations for the limited band communications by the UE, and perform the PDC operation for the limited band communications based on the unicast control message.

Another apparatus for wireless communications at a UE is described. The apparatus may include means for transmitting a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service, means for receiving a unicast control message that indicates a PDC operation of the one or more PDC operations for the limited band communications by the UE, and means for performing the PDC operation for the limited band communications based on the unicast control message.

A non-transitory computer-readable medium storing code for wireless communications at a UE is described. The code may include instructions executable by at least one processor to transmit a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service, receive a unicast control message that indicates a PDC operation of the one or more PDC operations for the limited band communications by the UE, and perform the PDC operation for the limited band communications based on the unicast control message.

Some examples of the method, apparatuses, and non-transitory computer-readable medium described herein may further include operations, features, means, or instructions for receiving, as part of the unicast control message, time reference information associated with the one or more PDC operations, the PDC operation performed based on the time reference information.

Some examples of the method, apparatuses, and non-transitory computer-readable medium described herein may further include operations, features, means, or instructions for receiving, via a system information block (SIB) message, time reference information associated with the one or more PDC operations, the PDC operation performed based on the time reference information.

Some examples of the method, apparatuses, and non-transitory computer-readable medium described herein may further include operations, features, means, or instructions for receiving, as part of the unicast control message, an indication to receive the time reference information via the SIB message, the time reference information via the SIB message received in accordance with the indication.

Some examples of the method, apparatuses, and non-transitory computer-readable medium described herein may further include operations, features, means, or instructions for receiving, as part of the unicast control message, a timing advance (TA) indication associated with the PDC operation, the PDC operation performed based on the TA indication.

Some examples of the method, apparatuses, and non-transitory computer-readable medium described herein may further include operations, features, means, or instructions for receiving a medium access control-control element (MAC-CE) indicative of a TA indication, a size of the MAC-CE being greater than a threshold quantity of bits, the PDC operation performed based on the TA indication.

Some examples of the method, apparatuses, and non-transitory computer-readable medium described herein may further include operations, features, means, or instructions for receiving, as part of the unicast control message, a timing delta associated with a network entity, the PDC operation performed based on the timing delta associated with the network entity.

Some examples of the method, apparatuses, and non-transitory computer-readable medium described herein may further include operations, features, means, or instructions for measuring a first timing delta associated with the UE, the first timing delta based on a transmission time of a first reference signal from the UE and a reception time of a second reference signal at the UE.

In some examples of the method, apparatuses, and non-transitory computer-readable medium described herein, the first reference signal may be one of a sounding reference signal (SRS) or a physical random access channel signal (PRACH) and the second reference signal may be one of a cell-specific reference signal (CRS) or a positioning reference signal (PRS), the first reference signal may be based on a mode of operation at the UE.

In some examples of the method, apparatuses, and non-transitory computer-readable medium described herein, the first reference signal may be a narrow band physical random access channel signal (NPRACH) and the second reference signal may be one of a narrowband positioning reference signal (NPRS) or a narrowband reference signal (NRS).

Some examples of the method, apparatuses, and non-transitory computer-readable medium described herein may further include operations, features, means, or instructions for receiving a measurement configuration indicative of one or more resources for the second reference signal, the second reference signal being for measurement of the first timing delta associated with the UE.

Some examples of the method, apparatuses, and non-transitory computer-readable medium described herein may further include operations, features, means, or instructions for transmitting a measurement report that includes the first timing delta associated with the UE, the PDC operation performed based on transmission of the measurement report.

Some examples of the method, apparatuses, and non-transitory computer-readable medium described herein may further include operations, features, means, or instructions for receiving a second unicast control message that indicates a periodicity associated with transmission of the measurement report, the measurement report transmitted in accordance with the periodicity.

Some examples of the method, apparatuses, and non-transitory computer-readable medium described herein may further include operations, features, means, or instructions for receiving a second unicast control message that indicates a configuration associated with a semi-persistent transmission of the measurement report and receiving a MAC-CE that activates or deactivates the semi-persistent transmission of the measurement report in accordance with the configuration.

Some examples of the method, apparatuses, and non-transitory computer-readable medium described herein may further include operations, features, means, or instructions for receiving downlink control information (DCI) that triggers the UE to transmit the measurement report, the measurement report transmitted in response to reception of the DCI.

Some examples of the method, apparatuses, and non-transitory computer-readable medium described herein may further include operations, features, means, or instructions for receiving a report configuration that indicates a timing delta threshold, the measurement report transmitted in response to satisfaction of the timing delta threshold by the first timing delta associated with the UE.

In some examples of the method, apparatuses, and non-transitory computer-readable medium described herein, the measurement report may be in response to a difference between the first timing delta associated with the UE and a second timing delta associated with the UE satisfying a threshold, the second timing delta may be measured prior to the first timing delta.

In some examples of the method, apparatuses, and non-transitory computer-readable medium described herein, the one or more PDC operations to include a TA based operation, a round trip time (RTT) based operation, or both.

In some examples of the method, apparatuses, and non-transitory computer-readable medium described herein, the limited band communications to include one of machine type communications (MTC) or narrowband internet of things (NB-IoT) communications.

In some examples of the method, apparatuses, and non-transitory computer-readable medium described herein, the one or more PDC operations may be separately configured for a terrestrial network (TN) and a non-terrestrial network (NTN).

A method for wireless communications at a network entity is described. The method may include obtaining a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service, outputting a unicast control message that indicates a PDC operation of the one or more PDC operations for the limited band communications by the UE, and performing the PDC operation for the limited band communications based on the unicast control message.

An apparatus for wireless communications at a network entity is described. The apparatus may include at least one processor, at least one memory coupled with the at least one processor, and instructions stored in the at least one memory. The instructions may be executable by the at least one processor to cause the apparatus to obtain a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service, output a unicast control message that indicates a PDC operation of the one or more PDC operations for the limited band communications by the UE, and perform the PDC operation for the limited band communications based on the unicast control message.

Another apparatus for wireless communications at a network entity is described. The apparatus may include means for obtaining a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service, means for outputting a unicast control message that indicates a PDC operation of the one or more PDC operations for the limited band communications by the UE, and means for performing the PDC operation for the limited band communications based on the unicast control message.

A non-transitory computer-readable medium storing code for wireless communications at a network entity is described. The code may include instructions executable by at least one processor to obtain a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service, output a unicast control message that indicates a PDC operation of the one or more PDC operations for the limited band communications by the UE, and perform the PDC operation for the limited band communications based on the unicast control message.

In some examples of the method, apparatuses, and non-transitory computer-readable medium described herein, outputting, as part of the unicast control message, time reference information associated with the one or more PDC operations, the PDC operation performed based on the time reference information.

In some examples of the method, apparatuses, and non-transitory computer-readable medium described herein, outputting, via a SIB message, time reference information associated with the one or more PDC operations, the PDC operation performed based on the time reference information.

In some examples of the method, apparatuses, and non-transitory computer-readable medium described herein, outputting, as part of the unicast control message, an indication to receive the time reference information via the SIB message, reception of the time reference information via the SIB message may be in accordance with the indication.

In some examples of the method, apparatuses, and non-transitory computer-readable medium described herein, outputting, as part of the unicast control message, a TA indication associated with the PDC operation, the PDC operation performed based on the TA indication.

Some examples of the method, apparatuses, and non-transitory computer-readable medium described herein may further include operations, features, means, or instructions for outputting a MAC-CE indicative of a TA indication, a size of the MAC-CE being greater than a threshold quantity of bits, the PDC operation performed based on the TA indication.

In some examples of the method, apparatuses, and non-transitory computer-readable medium described herein, outputting, as part of the unicast control message, a timing delta associated with the network entity, the PDC operation performed based on the timing delta associated with the network entity.

Some examples of the method, apparatuses, and non-transitory computer-readable medium described herein may further include operations, features, means, or instructions for obtaining measurement report that includes a first timing delta associated with the UE, the first timing delta based on a transmission time of a first reference signal from the UE and a reception time of a second reference signal at the UE.

In some examples of the method, apparatuses, and non-transitory computer-readable medium described herein, the first reference signal may be one of a sounding reference signal or a PRACH signal and the second reference signal may be one of a CRS or a PRS, the first reference signal may be based on a mode of operation at the UE.

In some examples of the method, apparatuses, and non-transitory computer-readable medium described herein, the first reference signal may be a NPRACH signal and the second reference signal may be one of a NPRS or a NRS.

Some examples of the method, apparatuses, and non-transitory computer-readable medium described herein may further include operations, features, means, or instructions for outputting a measurement configuration indicative of one or more resources for the second reference signal, the second reference signal being for measurement of the first timing delta associated with the UE.

Some examples of the method, apparatuses, and non-transitory computer-readable medium described herein may further include operations, features, means, or instructions for outputting a second unicast control message that indicates a periodicity associated with transmission of the measurement report at the UE, the measurement report obtained in accordance with the periodicity.

Some examples of the method, apparatuses, and non-transitory computer-readable medium described herein may further include operations, features, means, or instructions for outputting a second unicast control message that indicates a configuration associated with a semi-persistent transmission of the measurement report and outputting a MAC-CE that activates or deactivates the semi-persistent transmission of the measurement report in accordance with the configuration.

In some examples of the method, apparatuses, and non-transitory computer-readable medium described herein, outputting DCI that triggers the UE to transmit the measurement report, the measurement report obtained in response to output of the DCI.

Some examples of the method, apparatuses, and non-transitory computer-readable medium described herein may further include operations, features, means, or instructions for outputting a report configuration that indicates a timing delta threshold, the measurement report obtained in response to satisfaction of the timing delta threshold by the first timing delta associated with the UE.

In some examples of the method, apparatuses, and non-transitory computer-readable medium described herein, the measurement report may be in response to a difference between the first timing delta associated with the UE and a second timing delta associated with the UE satisfying a threshold, the second timing delta measured prior to the first timing delta associated with the UE.

In some examples of the method, apparatuses, and non-transitory computer-readable medium described herein, the one or more PDC operations to include a TA based operation, a RTT based operation, or both.

In some examples of the method, apparatuses, and non-transitory computer-readable medium described herein, the limited band communications to include one of MTCs or NB-IoT communications.

In some examples of the method, apparatuses, and non-transitory computer-readable medium described herein, the one or more PDC operations may be separately configured for a TN and a NTN.

DETAILED DESCRIPTION

Figure 1:
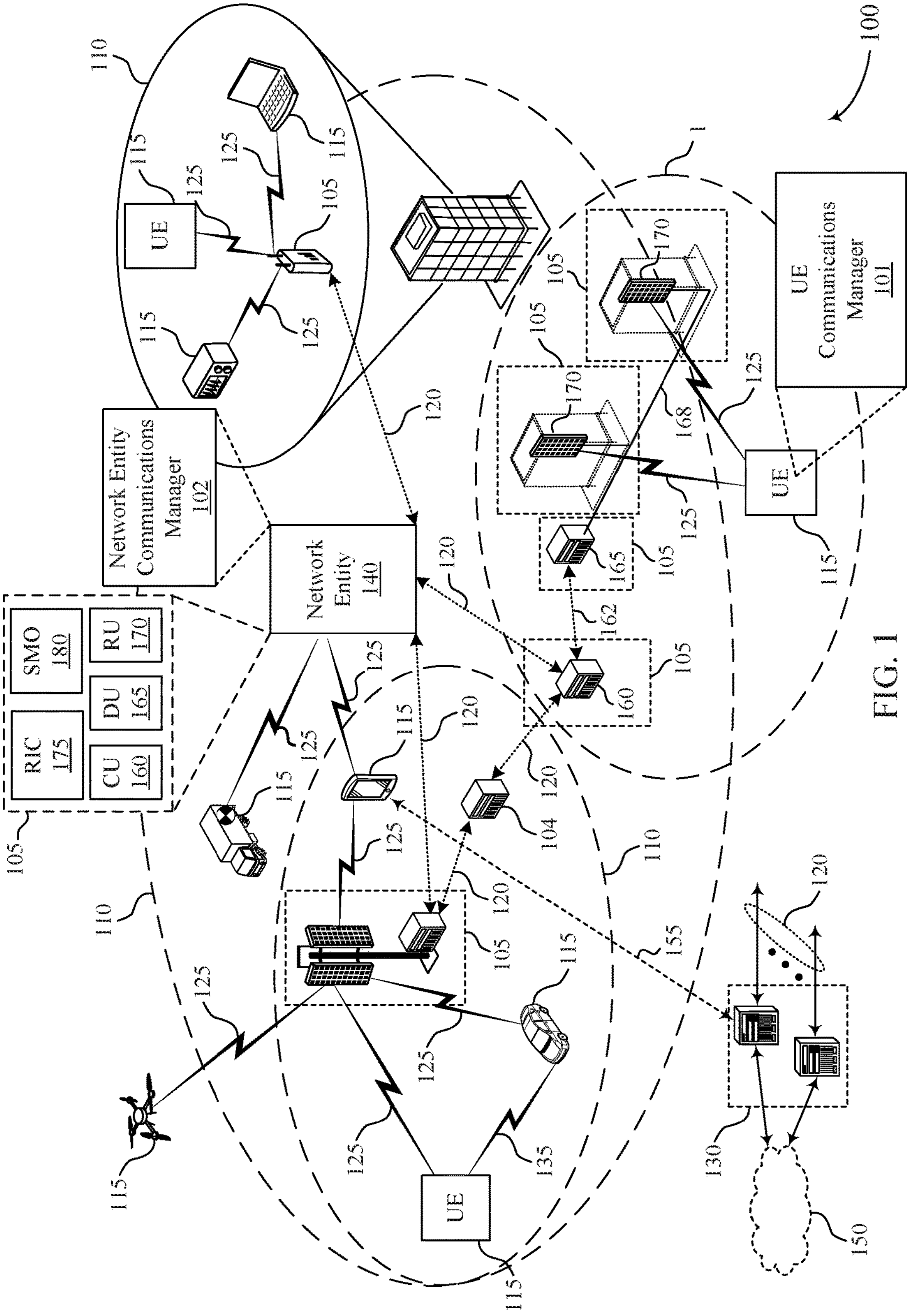
FIG. 1 shows an example of a wireless communications system that supports PDC for limited band communications in accordance with one or more aspects of the present disclosure.

In some wireless communications systems, a UE may support limited band communications (e.g., band limited communications), such as machine type communication (MTC) or narrow band internet of things (NB-IoT) communications. To support the limited band communications, the UE may operate using a carrier (e.g., channel) that has a bandwidth below a bandwidth threshold. For example, if the UE supports MTCs, then the UE may operate according to a carrier that spans up to six resource blocks (RBs), while if the UE supports NB-IoT communications, the UE may operate according to a carrier that spans up to one RB. In such cases, however, because the UE is operating using carriers that have limited bandwidths, the UE may be unable to meet link budgets (e.g., latency targets) for various services (e.g., applications) of the wireless communications system, such as a clock synchronization service (e.g., a service which may align otherwise independent clocks at wireless devices such as UEs).

For example, each RB may span 180 kilohertz (kHz). As such, using six RBs for MTC communications, an uplink transmission from the UE to the network entity may take approximately 925 ns (e.g., 6 RBs×180 kHz=1.08 MHz and 1/1.08 MHz=925 ns), while using a single RB for NB-IoT communications, an uplink transmission from the UE to the network entity may take approximately 5.55 μs (e.g., 1/180 kHz=5.55 μs). However, link budgets associated with the clock synchronization service may be less than such transmission times, resulting in the UE being unable to meet such link budgets. As such, if the UE is unable satisfy the link budget of the clock synchronization service, the UE may be unable to perform the clock synchronization service, thereby resulting in increased latency and communication timing mismatches in the wireless communications system. That is, if the UE is unable to meet the link budgets of the clock synchronization service, then the UE may not align a clock of the UE with the clocks of the network entity or various other UEs within the wireless communications system, resulting in communication timing mismatches and increased latency.

The techniques described herein may enable a limited band UE (e.g., MTC UE or NB-IoT UE) to perform a propagation delay compensation (PDC) operation in order to determine (e.g., calculate, compute, obtain), and compensate for, propagation delays in communications between the UE and the network entity. By accounting for such propagation delays, the UE may be able to satisfy the link budget for different services, such as a clock synchronization service, for one or more uplink transmissions. For example, the UE may transmit, to a network entity, a message (e.g., such as an uplink control information (UCI) message) indicating a capability of the UE to perform one or more PDC operations for the limited band communications. The one or more PDC operations may include a round trip time (RTT) based PDC operation, a timing advance (TA) based PDC operation, or both. In such examples, the limited band communications may be associated with communications via a carrier having a bandwidth below a threshold bandwidth (e.g., MTC carriers span 6 RBs while NB-IoT carriers span a single RB) and the limited band communications may be associated with the link budget for the clock synchronization service.

In response, a network entity may transmit a unicast control message (e.g., a unicast radio resource control (RRC) message) that indicates which PDC operation the UE is to perform (e.g., the unicast RRC message may instruct the UE to perform one or more of the PDC operations indicated by the capability of the UE). In some examples, the UE may perform a TA based PDC operation in accordance with a TA indication (e.g., timingAdvanceIndication), which may be received via the unicast message or via a medium access control-control element (MAC-CE) message, such as an enhanced MAC-CE. In some other examples, the UE may perform an RTT based PDC procedure in accordance with a network timing delta (e.g., rxTxTimeDiff-eNB) received via the unicast message and a UE timing delta (e.g., rxTxTimeDiff-ue or ue-RxTxTimeDiffResult) measured by the UE.

By performing the PDC operation(s), the UE may be able to satisfy the link budget associated with the clock synchronization service. For example, by enabling the limited band UE to perform PDC operations, such as RTT and TA based operations, the UE may be able to compensate for the propagation delay of an uplink transmission based on the network and UE timing deltas (e.g., calculate a RTT of a transmission based on the network and UE timing deltas and use the calculated RTT to compensate for the propagation delay) or on the TA indication (e.g., a time delay indication that the UE may use for one or more uplink transmission in order to compensate for the propagation delay), resulting in improved communications and synchronization between the UE and the network entity.

As used herein, the message indicative of the capability of the UE may be an example of UCI, UE assistance information (UAI), or the like. Further, the one or more PDC operations may be examples of a TA operation, an RTT operation, or both. For example, a PDC operation may be an operation taken by the UE in order to compensate for a propagation delay in communications between the UE and the network entity. Such PDC operations may include a TA operation, an RTT operation, or both. The limited band communications may refer to, or otherwise be examples of, communications via a carrier that is limited (e.g., restricted)

to a bandwidth that is below a bandwidth threshold (e.g., 6 RBs, 1 RB), such as MTCs or NB-IoT communications. As used herein, a link budget (e.g., Uu interface budget) may refer to latency or timing targets of a communication between the UE and the network entity.

A clock synchronization service may be a service to align otherwise independent clocks of wireless devices (such as user-specific UE clocks) within the wireless communication system. The unicast control message may be an example of a unicast RRC message. The network timing delta may be a time measurement, taken by the network entity, that represents the difference between a reception time of an uplink message from the UE and a transmission time of a downlink message to the UE. Similarly, the UE timing delta may be a time measurement, taken by the UE, that represents the time difference between a reception time of the downlink message from the network entity and a transmission time of the uplink message to the network entity.

Aspects of the disclosure are initially described in the context of wireless communications systems. Aspects of the disclosure are further described herein with reference to process flows. Aspects of the disclosure are further illustrated by and described with reference to apparatus diagrams, system diagrams, and flowcharts that relate to PDC for limited band communications.

FIG. 1 shows an example of a wireless communications system 100 that supports PDC for limited band communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. The UE 115 may include a UE communications manager 101 to facilitate communications with one or more devices in the wireless communications system, while the network entity 105 may include a network communications manager 102 to facilitate communications with one or more devices.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support PDC for limited band communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a MTC (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some examples, a slot may further be divided into multiple mini slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, NB-IoT, enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a base station 105 may additionally or alternatively be performed by components of the disaggregated RAN architecture (e.g., IAB nodes, DUs, CUs, etc.).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some cases, the UE 115 and the network entity 105 may support various services (e.g., applications or operations), where one such service may be a clock synchronization service. For NR, the clock synchronization performance targets may be defined for 5G systems by a standards body (such as the 3GPP), an example of which is shown in Table 1. In such cases, some use cases of the clock synchronization service may be used as part of a PDC operation.

TABLE 1

| Evaluation Cases | Quantity of Devices in one Communication Group for Clock Synchronization | 5GS Synchronicity Budget Requirement | Service Area | Scenario | Single Uu Interface Budget |
|---|---|---|---|---|---|
| Case 1 | Up to 300 UEs | ≤900 nanoseconds (ns) | ≤1000 meters (m) by 100 m | Control-to-Control communication for industrial controller. | ±145 ns to ±275 ns |
| Case 2 | Up to 100 UEs | <1 microsecond (μs) | <20 square kilometers ($km^2$) | Smart Grid: Synchronicity between phasor measurement units (PMUs) | ±795 ns to ±845 ns |

For example, a first use case (e.g., case 1 or scenario 1) may be for control-to-control communications for industrial controllers within a service area of approximately to 1000 m by 100 m of the network entity 105. In such examples, up to 300 UEs 115 may be in a communication group and connected to the network entity 105. Further, the control-to-control communication for industrial controllers (e.g., first use case) may require a 5GS synchronicity budget of less than or equal to 900 ns. Further, such use case may require a single Uu interface budget (e.g., uplink transmission link budget) of ±145 ns to ±275 ns.

A second use case (e.g., case 1 or scenario 1) may be for synchronicity between PMUs operating in a smart grid (e.g., electrical grids configured to both provide electricity and receive electricity). In such use cases, the PMUs may operate within a service area of approximately 25 $km^2$ of the network entity 105. Further, in such examples, up to 100 UEs 115 may be in the communication group and connected to the network entity 105. The communication between the UEs 115 may require a 5GS synchronicity budget of less than a single μs. Further, such use case may require a single Uu interface budget (e.g., uplink transmission link budget) of ±795 ns to ±845 ns.

In order to meet such targets, the UE 115, the network entity 105, or both may support and perform TA based and RTT based schemes (e.g., PDC operations). That is, to account for propagation delays within the wireless communications system 100, the UE 115, the network entity 105, or both may perform PDC operations in order to meet the timing targets for such use cases. As such, for TA based PDC operations, the UE 115 may operate according to a legacy TA based scheme, where the network entity 105 may transmit a TA indication to the UE 115. Such TA indication may be an offset for uplink transmissions at the UE 115, such that each UE 115 operating within the applies a respective TA in order to account for the propagation delays in the network.

For RTT based PDC operations, the UE 115 and the network entity 105 may use RTT (e.g., as defined in the 3GPP standards) as a baseline and use RRC configurations for single cell RTT-based PDC. In such examples, the UE 115 and the network entity 105 may use a single pair of a channel state information (CSI) reference signal (CSI-RS) for tracking (e.g., tracking reference signals (TRS) or positioning reference signals (PRS) and a sounding reference signal (SRS) configuration for the respective timing delta (e.g., Rx-Tx Time Difference) estimation. That is, the network entity 105 and the UE 115 may calculate respective timing deltas based on a downlink CSI-RS for tracking (e.g., TRS or PRS) and an uplink SRS.

For example, the RTT procedure may resemble type-1 TA positioning as defined for LTE enhanced cell identification (E-CID). In such examples, the timing synchronization (e.g., RTT based procedure) may involve RAN signaling between the UE 115 and the network entity 105, which may be different from Multi-RTT based signaling flow which involves a location management function (LMF), an application and management function (AMF), or both. As described, the UE 115 and the network entity 105 may be configured with a single pair of reference signals (e.g., downlink TRS or PRS and uplink SRS) via RRC signaling for RTT-based PDC. Further, the UE 115 and the network entity 105 may exchange (e.g., transmit) respective timing delta measurements via RRC signaling.

In some examples, the network entity 105 may provision (e.g., transmit) the network timing delta (e.g., rxTxTimeDiff-gNB) to the UE 115 in order to implicitly activate the RTT-based PDC (e.g., UE timing delta) calculation at the UE 115. For the network based PDC, the network entity 105 may configure the UE 115 to report the UE timing delta (e.g., rxTxTimeDiff-ue) periodically or via one-shot on-demand messaging. In such examples of RTT based PDC, a UE 115 that supports FG 25-19/25-19a (UE feature numbers) may support UE-side PDC RTT with additional optional support for network side PDC RTT. That is, the UE 115 may support various RTT based PDC operations (e.g., UE side or network side) based on the capabilities of the UE 115.

For NR RTT based PDC operations, the network entity 105 and the UE 115 may perform the respective timing delta measurements based on a pair of reference signals, such as a downlink reference signal (e.g., PRS or TRS) and an uplink reference signal (e.g., a SRS). In such examples, the UE 115 may be configured with a PRS resource set for PDC via a serving cell configuration (e.g., ServingCellConfig) information element of an RRC message, which may be separate from PRS for positioning operations configured by LTE positioning protocol (LPP). Additionally, the network entity 105 may enable or disable a TRS for PDC via a single non-zero power (NZP) CSI-RS set associated with the TRS. That is, the network entity 105 may activate or deactivate the TRS for the UE 115 based on the NZP-CSI-RS associated with the TRS. In some examples, the network entity 105 may enable or disable the SRS for the PDC per SRS resource set. Additionally, the UE 115 may be configured with spatial relation information for PDC operations (e.g., SRS-SpatialRelationInfo-PDC) per SRS resource, where such spatial relationship information may be configured separately from spatial relation information (e.g., SRS-SpatialRelationInfo) not intended for PDC operations.

For network side PDC operations (e.g., gNB-based PDC), the network entity 105 may configure measurement and reporting of the UE timing delta from the UE 115. For example, to indicate which downlink reference signal the UE 115 is to use for measurement of the UE timing delta, the network entity 105 may transmit a measurement information element (e.g., measObjectRxTxDiff) via a RRC message. Further, as described herein, the UE 115 may be configured, from the network entity 105, to report the measured UE timing delta for PDC of a serving cell.

Alternatively, for UE side PDC operations, the network entity 105 may indicate the network timing delta (e.g., RxTxTimeDIff-gNB-r17) via a network access stratum (NAS) dedicated information element (e.g., DLInformation-Transfer) via a downlink control channel to assist the UE 115 in calculating the propagation delay based on the RTT-method. Such NAS dedicated information element, including the network timing delta, may be illustrated below:

```
DLInformationTransfer ::= SEQUENCE {
  timeReferenceInfo-r15    TimeReferenceInfo-r15              OPTIONAL, -- Need N
  rxTxTimeDiff-gNB-r17     RxTxTimeDiff-r17                   OPTIONAL, -- Need N
  ta-PDC-r17               ENUMERATED {activate,deactivate}   OPTIONAL, -- Need N
  sib9Fallback-r17         ENUMERATED {true}                  OPTIONAL, -- Need N
```

In some cases, the UE 115 115 may support limited band communications, such as MTCs and NB-IoT communications. To support the limited band communications, the UE 115 may operate using a carrier (e.g., channel) that has a bandwidth below a bandwidth threshold. For example, if the UE 115 supports MTCs, then the UE 115 may operate according to a carrier that spans six RBs, while if the UE 115 supports NB-IoT communications, the UE 115 may operate according to a carrier that spans a single RB. In such cases, however, because the UE 115 is operating according to a reduced bandwidth relative to other communications, the UE 115 may not be able to meet link budgets (e.g., synchronization targets) for various services (e.g., applications) of the wireless communications system, such as a clock synchronization service. As such, if the UE 115 is unable satisfy the link budget of the clock synchronization service, the UE 115 may be unable to perform the clock synchronization service, thereby resulting in increased latency and communication mismatches in the wireless communications system 100.

The techniques described herein may enable the UE 115 (e.g., MTC UE or NB-IoT UE) to perform a PDC operation in order to calculate, and compensate for, propagation delays in communications between the UE 115 and the network entity 105. As such, based on accounting for such propagation delays, the UE 115 may be able to satisfy the link budget for the clock synchronization service for one or more uplink transmissions. For example, the UE 115 may transmit, to a network entity 105, a message (e.g., such as UCI) indicating a capability of the UE 115 to perform one or more PDC operations for the limited band communications, such as a RTT based PDC operation, a TA based PDC operation, or both. In such examples, the limited band communications may be associated with communications via a carrier having a bandwidth below a threshold bandwidth (e.g., MTC carriers span 6 RBs while NB-IoT carriers span a single RB) and the limited band communications may be associated with the link budget for the clock synchronization service.

In response, the network entity 105 may transmit a unicast control message (e.g., such as a unicast RRC message) that indicates which PDC operation the UE 115 is to perform. In some examples, the UE 115 may perform a TA based PDC operation in accordance with a TA indication (e.g., timingAdvanceIndication) received via the unicast message or via an enhanced MAC-CE message. In some other examples, the UE 115 or network entity 105 may perform a RTT based PDC procedure in accordance with a network timing delta (e.g., rxTxTimeDiff-eNB) received via the unicast message and a UE 115 timing delta (e.g., rxTxTimeDiff-ue or ue-RxTxTimeDiffResult) measured by the UE 115.

Figure 2:
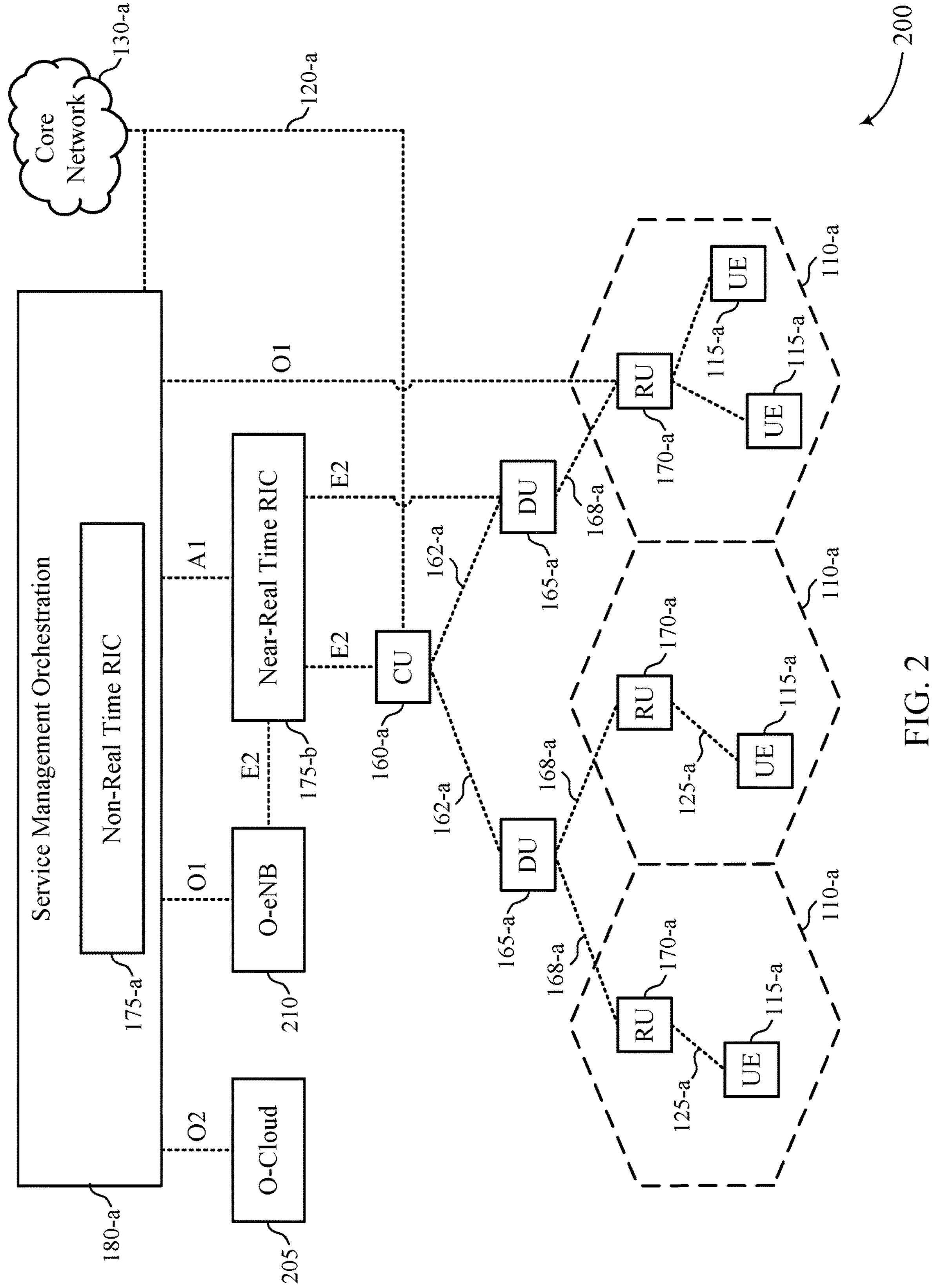
FIG. 2 shows an example of a network architecture that supports PDC for limited band communications in accordance with one or more aspects of the present disclosure.

FIG. 2 shows an example of a network architecture 200 (e.g., a disaggregated base station architecture, a disaggregated RAN architecture) that supports PDC for limited band communications in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, PRACH (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage targets which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
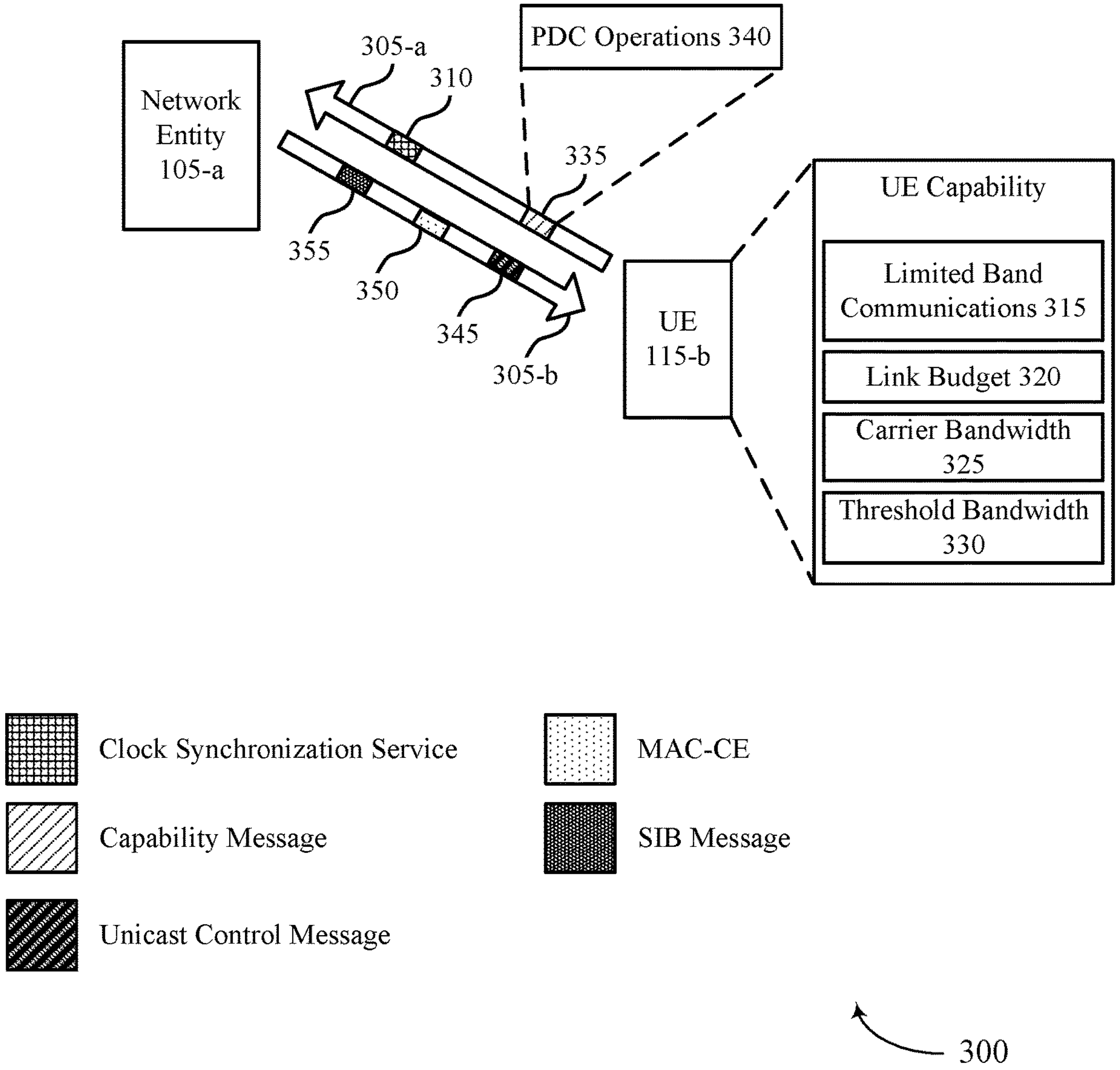
FIG. 3 shows an example of a wireless communications system that supports PDC for limited band communications in accordance with one or more aspects of the present disclosure.

FIG. 3 shows an example of a wireless communications system 300 that supports PDC for limited band communications 315 in accordance with one or more aspects of the present disclosure. Aspects of the wireless communications system 300 may implement, or be implemented by, aspects of wireless communications system 100 and the network architecture 200 as described herein with reference to FIGS. 1 and 2. For example, the wireless communications system 300 may include a network entity 105-*a* and a UE 115-*b*, which may be examples of corresponding devices described herein. The techniques described in the context of the wireless communications system 300 may enable the UE 115-*b* (e.g., an MTC or NB-IoT) to perform on or more PDC operations 340 while operating in limited band communications 315.

For example, the UE 115-*b* may support, or otherwise be configured for, limited band communications 315, such as MTC or NB-IoT communications. For the limited band communications 315, the UE 115-*b* and the network entity 105-*a* may communicate according to various synchronization service performance targets (e.g., link budgets 320 for clock synchronization services 310), such as performance targets for smart grid use cases as detailed in Table 2 below.

TABLE 2

| Evaluation Cases | Quantity of Devices in one Communication Group for Clock Synchronization | 5GS Synchronicity Budget Requirement | Service Area | Scenario | Single Uu Interface Budget |
|---|---|---|---|---|---|
| Case 2 | Up to 100 UEs | <1 μs | <20 $km^2$ | Smart Grid: Synchronicity between PMUs | ±795 ns to ±845 ns |

TABLE 2-continued

| Evaluation Cases | Quantity of Devices in one Communication Group for Clock Synchronization | 5GS Synchronicity Budget Requirement | Service Area | Scenario | Single Uu Interface Budget |
|---|---|---|---|---|---|
| Case 2a | Up to 100 UEs | <10 μs-20 μs | <20 km$^2$ | Smart Grid: Sampled Values -Power system protection in digital substation | ±7.95 μs to ±8.45 μs |

For example, a first smart grid use case (e.g., Case 2 or Scenario 2) may be for synchronization between PMUs of a smart grid (e.g., an electrical grid configured to provide electricity to, and receive electricity from, various homes, buildings, or the like). In such use cases, the network entity 105-*a* may support up to 100 UEs 115 within a communication group for clock synchronization, where the 5GS synchronicity budget for such UEs 115 may be less than 1 is and the single Uu interface budget (e.g., link budget 320 for an uplink transmission from the UE 115-*b* to the network entity 105-*a*) for such UEs 115 may be between 795 ns and 845 ns. A second smart grid use case (e.g., Case 2A or Scenario 2A) may be for power system protection for digital substations of the smart grid. In such use cases, the network entity 105-*a* may support up to 100 UEs 115 within a communication group for clock synchronization, where the 5GS synchronicity budget for such UEs 115 may be less than 10 μs to 20 μs and the single Uu interface budget for such UEs 115 may be between 7.95 μs and 8.45 μs.

In such cases, however, the UE 115-*b* operating according to limited band communications 315 (e.g., MTC or NB-IoT communications) may be unable to meet such Uu interface budget targets (e.g., link budgets 320). For example, for MTC and NB-IoT communications of TNs or NTNs, downlink carrier 305-*b* and an uplink carrier 305-*a* may have the same narrow-bands (e.g., limited bands) of six RBs for MTCs and a single RB for NB-IoT communications, where each RB may span 180 kilohertz (kHz). That is, the uplink carrier 305-*a* and the downlink carrier 305-*b* may have a carrier bandwidth 325 (e.g., quantity of RBs) that is less than or equal to a threshold bandwidth 330 (e.g., such as six RBs for MTCs and a single RB for NB-IoT communications). As such, using six RBs for MTC communications, an uplink transmission from the UE 115-*b* to the network entity 105-*a* may take approximately 925 ns (e.g., 6 RBs×180 kHz=1.08 MHz and 1/1.08 MHz=925 ns), while using a single RB for NB-IoT communications, an uplink transmission from the UE 115-*b* to the network entity 105-*a* may take approximately 5.55 μs (e.g., 1/180 kHz=5.55 μs).

However, such communications may not be able to satisfy the link budget 320 (e.g., interface budget targets) of the smart grid use cases. For example, as detailed in table 3, the single Uu interface budget targets (e.g., link budget 320) for the first use case of the smart grid (e.g., Case 2) may be between 795 ns and 845 ns, while the single Uu interface budget targets (e.g., link budget 320) for the second use case of the smart grid (e.g., Case 2A) may be between 7.95 μs and 8.45 μs. In such cases, the UE 115-*b*, using limited band communications 315, may be able to satisfy the link budget 320 (e.g., targets) of smart grid case 2a but may be unable to satisfy the link budget 320 (e.g., targets) of smart grid case 2. Thus, techniques may be desired to support PDC operations 340 for MTC and NB-IoT in terrestrial networks (TNs) as well as non-TNs (NTNs).

TABLE 3

| Evaluation Cases | Single Uu Interface Budget |
|---|---|
| Case 2 | ±795 ns to ±845 ns |
| Case 2a | ±7.95 μs to ±8.45 μs |

The techniques described herein may enable the UE 115-*b* (e.g., MTC or NB-IoT UE) to support TA based PDC operations 340, RTT based PDC operations 340, or both based on a capability of the UE 115-*b* and a configuration from the network entity 105-*a*. For example, the techniques described herein may provide enhancements to TA based PDC operations 340 in order to satisfy the link budgets 320 (e.g., interface budgets) of the clock synchronization service 310 (e.g., case 2 and case 2a). Further, the techniques described herein may provide enhancements to RTT based PDC operations 340, such as enhancements to reference signal configurations and timing delta measurements (e.g., due to MTC UEs being unable to support TRSs and SRSs for coverage area mode B (CEModeB) and due to NB-IoT UEs being unable to support TRSs and SRSs).

For example, the UE 115-*b* may transmit a capability message 335 (e.g., such as UCI or UAI) that indicates a capability of the UE to perform one or more PDC operations 340 for limited band communications 315. In such examples, the UE 115-*b* may indicate a capability to perform RTT based PDC operations 340, TA based PDC operations 340, or both. Further, in such examples, the UE 115-*b* may indicate whether it is operating via MTCs or NB-IoT communications.

The network entity 105-*a* may transmit a unicast control message 345 (e.g., such as an unicast RRC message) to indicate which PDC operation 340 of the one or more PDC operations 340 the UE 115-*b* is to perform. For example, the network entity 105-*a* (e.g., the service cell) may activate or deactivate a UE side TA based PDC operation 340 or a UE side RTT based PDC operation 340 via a common operation field (e.g., ta-PDC) or separate operation fields in a downlink information transfer element (e.g., DLInformationTransfer) of the unicast control message 345. In such examples, if the UE 115-*b* is operating using MTCs, then the network entity 105-*a* may activate or deactivate the PDC operation 340 via the ta-PDC field within the DLInformationTransfer information element of the unicast control message 345 as illustrated below:

| | | |
|---|---|---|
| DLInformationTransfer ::= SEQUENCE { | | |
| timeReferenceInfo-r15 | TimeReferenceInfo-r15 | OPTIONAL, -- Need N |
| rxTxTimeDiff-eNB | RxTxTimeDiff | OPTIONAL, -- Need N |
| ta-PDC | ENUMERATED {activate, deactivate} | OPTIONAL, -- Need N |
| sib16Fallback | ENUMERATED {true} | OPTIONAL, -- Need N |
| [timingAdvanceIndication | TimingAdvanceIndication | OPTIONAL, -- Need N] |

Alternatively, if the UE 115-*b* is operating using NB-IoT communications, the network entity 105-*a* may activate or deactivate the PDC operation 340 via the ta-PDC field within the DLInformationTransfer-NB information element of the unicast control message 345 as illustrated below:

| | | |
|---|---|---|
| DLInformationTransfer ::= SEQUENCE { | | |
| timeReferenceInfo | TimeReferenceInfo | OPTIONAL, -- Need N |
| rxTxTimeDiff-eNB | RxTxTimeDiff | OPTIONAL, -- Need N |
| ta-PDC | ENUMERATED {activate, deactivate} | OPTIONAL, -- Need N |
| sib16Fallback | ENUMERATED {true} | OPTIONAL, -- Need N |
| [timingAdvanceIndication | TimingAdvanceIndication | OPTIONAL, -- Need N] |

For example, for either MTC or NB-IoT communications, if the operation field (e.g., ta-PDC) is set to activate, then the TA based PDC operation 340 may be enabled. That is, to activate the TA based PDC operation 340 at the UE 115-*b*, the network entity 105-*a* may set the operation field to activate and transmit the unicast control message 345 to the UE 115-*b*.

The UE 115-*b* may perform the TA based PDC operation 340 according to a TA command indication (e.g., timingAdvanceIndication). In some cases, for limited band communications 315 (e.g., MTC or NB-IoT communications), the TA based PDC operation 340 may have increased (e.g., worse) downlink and uplink timing errors as compared to those of the RTT based PDC operation 340 due to errors of the TA indication (e.g., reception to transmission time difference), where the TA indication (e.g., also referred to as a timing delta for TA based PDC operations 340) may be indicated via a legacy MAC-CE as illustrated in Table 4.

TABLE 4

| TAG ID (Two Bits) | TA Command (Six Bits) |
|---|---|

In order to achieve similar timing errors as those of the RTT based PDC operation 340, the network entity 105-*a* may transmit the TA indication with increased granularity (e.g., via an increased quantity of bits). In one example, the network entity 105-*a* may transmit the TA indication via a MAC-CE 350, where the TA indication included in the MAC-CE 350 may be indicated via up to 11 bits in order to achieve timing errors (e.g., $T_s=T_e/8$) similar those of an IAB timing delta delivered via a MAC-CE. That is, the network entity 105-*a* may transmit the TA indication via the MAC-CE 350, where a size of the TA indication indicated via the MAC-CE 350 is greater than a threshold quantity of bits (e.g., greater than six bits) as illustrated in table 5.

TABLE 5

| R (One Bit) | R (One Bit) | R(One Bit) | R (One Bit) | R (One Bit) | TA Indication (Three Bits) |
|---|---|---|---|---|---|
| TA Indication (Eight Bits) | | | | | |

In some examples, if the UE 115-*b* supports enhanced TA command indication granularity, the network entity 105-*a* may indicate the TA indication (e.g., timingAdvanceIndication) via the downlink information transfer element of the unicast control message 345, which may override the TA command of the legacy MAC-CE (e.g., shown in table 4). That is, the network entity 105-*a* may use the unicast control message 345 to indicate the TA indication in order to achieve timing errors (e.g., achieve an error of $T_s/4=T_e/32$) similar to those of the RTT based network and UE timing delta (e.g., reception to transmission time difference) indications. By increasing the granularity (e.g., increase the quantity of bits in which to convey the quantity of the TA indication) of the TA indication, the UE 115-*b* may be able compensate for the propagation delay in communications with the network entity 105-*a*, thereby resulting in reduced timing errors associated with the TA based PDC operation 340 and the ability to satisfy the link budget 320 for the clock synchronization service 310 (e.g., smart grid case 2 and 2a). That is, the UE 115-*b* may transmit various uplink transmissions in accordance with the TA indication (e.g., perform the PDC operation 340) received via the unicast control message 345 or the MAC-CE 350, thereby compensating for the propagation delay of the wireless communications system 300.

Alternatively, if the operation (e.g., ta-PDC) field is set to deactivate, then the RTT based PDC operation 340 may be implicitly enabled or activated. That is, to activate the RTT based PDC operation 340 at the UE 115-*b*, the network entity 105-*a* may set the operation field to deactivate (e.g., implicitly activating the RTT based PDC operation 340) and transmit the unicast control message 345 to the UE 115-*b*. In an other example, the RTT based PDC operation 340 may be explicitly activated by using a separate operation field (e.g., rtt-PDC separate from ta-PDC) in the downlink information transfer element (e.g., DLInformationTransfer or DLInformationTransfer-NB). As such, if both the ta-PDC and rtt-PDC are absent, the PDC operations 340 may not enabled by the network.

For UE side RTT based PDC operations 340 (e.g., the UE 115-*b* is responsible for compensating for the propagation delay), the network entity 105-*a* may configure a network timing delta (e.g., rxTxTimeDiff-eNB) to indicate the network estimated reference time information via the downlink information transfer element of the unicast control message 345. In such examples (e.g., UE side RTT based PDC operations 340), the network entity 105-*a* may configure the UE 115-*b* with an uplink and downlink reference signal pair, where the UE 115-*b* may calculate a UE timing delta (e.g., first timing delta associated with the UE 115-*b*) based on the uplink and downlink reference signal pair. The calculation of the UE timing delta and network timing delta may be further described herein with reference to FIG. 4. Based on calculating the UE timing delta, the UE 115-*b* may use the network timing delta and the UE timing delta to compensate for the propagation delay of transmissions between the UE 115-*b* and the network entity 105-*a* in order to meet the link budget 320 for the clock synchronization service 310. Such UE side RTT based PDC operations 340 may be further described herein with reference to FIG. 5.

Figure 4:
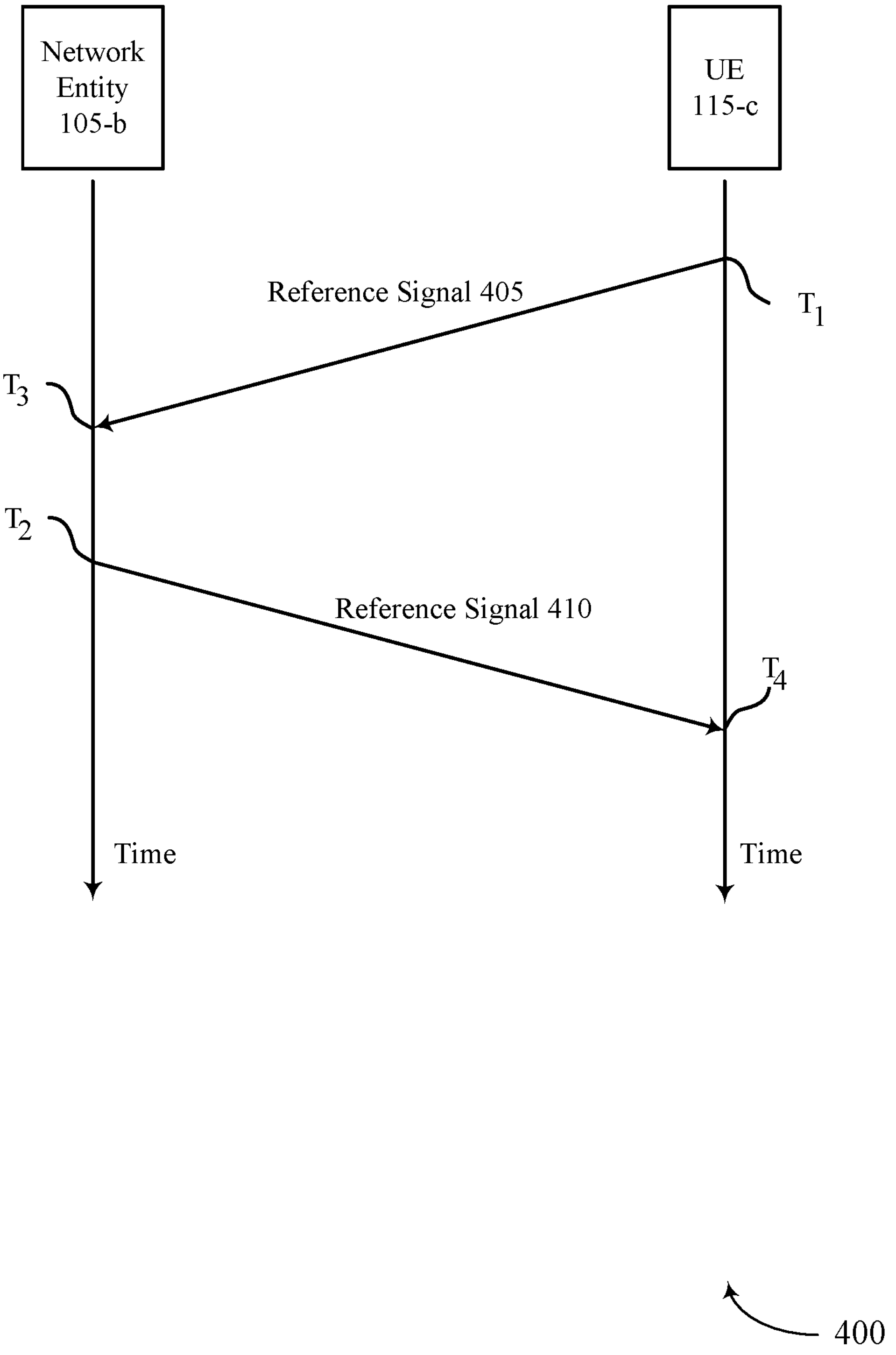
FIG. 4 shows an example of a process flow that supports PDC for limited band communications in accordance with one or more aspects of the present disclosure.

For network side RTT based PDC operations 340 (e.g., the network entity 105-*a* is responsible for compensating for the propagation delay), the network entity 105-*a* may configure the UE 115-*b* with an uplink and downlink signal pair, where the UE 115-*b* and the network entity 105-*a* may calculate respective timing deltas in accordance with techniques further described herein with reference to FIG. 4. Based on calculating the respective timing deltas, the UE 115-*b* may be configured to transmit a measurement report including the UE timing delta to the network entity 105-*a*, where the network entity 105-*a* may use the UE timing delta and the network timing delta to compensate for the propagation delay of transmissions between the UE 115-*b* and the network entity 105-*a* in order to meet the link budget 320 for the clock synchronization service 310. Such network side RTT based PDC operations 340 may be further described herein with reference to FIG. 6.

In some examples, the UE 115-*b* may perform the TA based PDC operation 340, RTT based PDC operation 340, or both in accordance with time reference information from the network entity 105-*a*. For example, for both MTC and NB-IoT communications, the network entity 105-*a* may indicate the time reference information (e.g., timeReferenceInfo-r15) associated with the one or more PDC operations 340 via the downlink information transfer element of unicast control message 345. The UE 115-*b* may use the time reference information to assist in time synchronization with the network entity 105-*a* and assist with the performance of the PDC operation 340 (e.g., TA based or RTT based). For example, using current techniques, the network entity 105-*a* may indicate the time reference information via a system information block (SIB) message 355 (e.g., such as SIB16), the unicast control message 345, or both for MTCs. However, using current techniques, such time reference information may be indicated via the SIB message 355 (e.g., SIB16) for legacy NB-IoT. As such, in accordance with the techniques described herein, the network entity 105-*a* may include (e.g., add) the time reference information to the downlink information transfer for NB-IoT (e.g., DLInformationTransfer-NB).

In some examples, the UE 115-*b* may fall back to receive the time reference information via the SIB message 355. For example, the network entity 105-*a* may configure (e.g., set to true) a SIB fallback field (e.g., sib16FallBack) of the downlink information transfer element of the unicast control message 345 in order to indicate for the UE 115-*b* to receive the time reference information via the SIB message 355. Alternatively, if the SIB fallback field is not configured (e.g., set to false or empty), then the UE 115-*b* may use the time reference information included in the downlink information transfer element of the unicast control message 345.

In this way, the network entity 105-*a* may indicate, to the UE 115-*b* operating in limited band communications 315, which PDC operation 340 to perform and one or more pieces of information associated with the selected PDC operation 340 via the unicast control message 345, the MAC-CE 350, the SIB message 355, or a combination thereof. As such, by performing the PDC operation 340, the UE 115-*b* may be able to meet the link budget 320 (e.g., performance targets, latency targets, or the like) of the clock synchronization service 310, leading to improved communications and reduced latency in the wireless communications system 300.

FIG. 4 shows an example of a process flow 400 that supports PDC for limited band communications in accordance with one or more aspects of the present disclosure. Aspects of the process flow 400 may be implemented by the wireless communications system 100, the network architecture 200, and the wireless communications system 300 as described herein with reference to FIGS. 1 through 3. For example, the process flow 400 may include a network entity 105-*b* and a UE 115-*b*, which may be examples of corresponding devices as described herein. The techniques described in the context of the process flow 400 may enable the UE 115-*c* and the network entity 105-*b* to perform RTT based PDC operations for limited band communications (e.g., MTC or NB-IoT communications).

As described herein, the UE 115-*c* and the network entity 105-*b* may calculate and use respective timing deltas (e.g., UE timing delta and network timing delta) as part of the RTT based PDC operation in order to compensate for propagation delay. As such, the UE 115-*c* and the network entity 105-*b* may use various reference signals (e.g., such as a reference signal 405 and a reference signal 410) to calculate the respective timing deltas and determine the RTT of an uplink transmission. For example, at $T_1$ (e.g., a first time stamp), the UE 115-*c* may transmit the reference signal 405 (e.g., uplink reference signal) to the network entity 105-*b*, while, at $T_2$, the network entity 105-*b* may transmit the reference signal 410. The network entity 105-*b* may receive the reference signal 405 at $T_3$, while the UE 115-*c* may receive the reference signal 410 at $T_4$.

Based on receiving the respective reference signals, the UE 115-*c* and the network entity 105-*b* may calculate the respective timing deltas according to the time stamps of the reference signal 405 and the reference signal 410. For example, the UE 115-*c* may calculate the UE timing delta (e.g., timing delta information associated with the UE 115-*c*) as the difference between the reception time (e.g., $T_4$) of the reference signal 410 and the transmission time (e.g., $T_1$) of the reference signal 405 (e.g., $UE_{Rx\text{-}Tx}$ Diff=$T_4-T_1$). Similarly, the network entity 105-*b* may calculate the network timing delta (e.g., timing delta information associated with the network entity 105-*b*) as the difference between the reception time (e.g., $T_3$) of the reference signal 405 and the transmission time (e.g., $T_2$) of the reference signal 410 (e.g., $gNB_{Rx\text{-}Tx}$ Diff=$T_3-T_2$). As such, the RTT of an uplink transmission between the UE 115-*c* and the network entity 105-*b* may be the sum of the network timing delta and the UE timing delta (e.g., RTT=$gNB_{Rx\text{-}Tx}$ Diff+$UE_{Rx\text{-}Tx}$ Diff).

In one example, the UE 115-*c* may be operating in, or otherwise performing, MTCs. As such, for MTCs, the UE 115-*c* and the network entity 105-*b* may calculate (e.g., estimate) the UE timing delta (e.g., timing delta information associated with the UE 115-*c*) and the network timing delta (e.g., timing delta information associated with the network entity 105-*b*) using the reference signal 405 and the reference signal 410. In such examples, the reference signal 405 (e.g., uplink reference signal) may be one of a SRS or a physical random access channel (PRACH) signal, while the reference signal 410 (e.g., downlink reference signal) may be one of a cell-specific reference signal (CRS) or PRS.

In such examples (e.g., MTCs), the reference signal 405 may be based on a mode of operation at the UE 115-*c*. For example, if the UE 115-*c* is operating according to coverage area mode A (CEModeA), then the reference signal 405 may be either one of the SRS or the PRACH signal, while the reference signal 410 may be either one of the CRS or the PRS. Alternatively, if the UE 115-*c* is operating according to CEModeB, then the reference signal 405 may be the PRACH signal (e.g., due to the UE 115-*c* not supporting TRS or SRS for CEModeB MTCs), while the reference signal 410 may be either one of the CRS or PRS.

In another example, the UE 115-*c* may be operating in, or otherwise performing, NB-IoT communications. As such, the UE 115-*c* and the network entity 105-*b* may calculate the respective timing deltas (e.g., reception to transmission time differences) between the UE 115-*a* and the network entity 105-*b* (e.g., service cell) for RTT based PDC operations using the reference signal 405 and the reference signal 410. In such examples, the reference signal 405 may be an example of a NB PRACH (NPRACH) signal, while the reference signal 410 may be one of a NB positioning reference signal (NPRS) or a NB reference signal (NRS). That is, the UE 115-*c* and the network entity 105-*b* may use one of a NPRS or NRS for the reference signal 410 and the NPRACH for the reference signal 405 in order to estimate the respective timing deltas for NB-IoT communications (e.g., due to the UE 115-*c* being unable to support TRS, SRS, or physical uplink control channels (PUCCHs) for NB-IoT).

Figure 5:
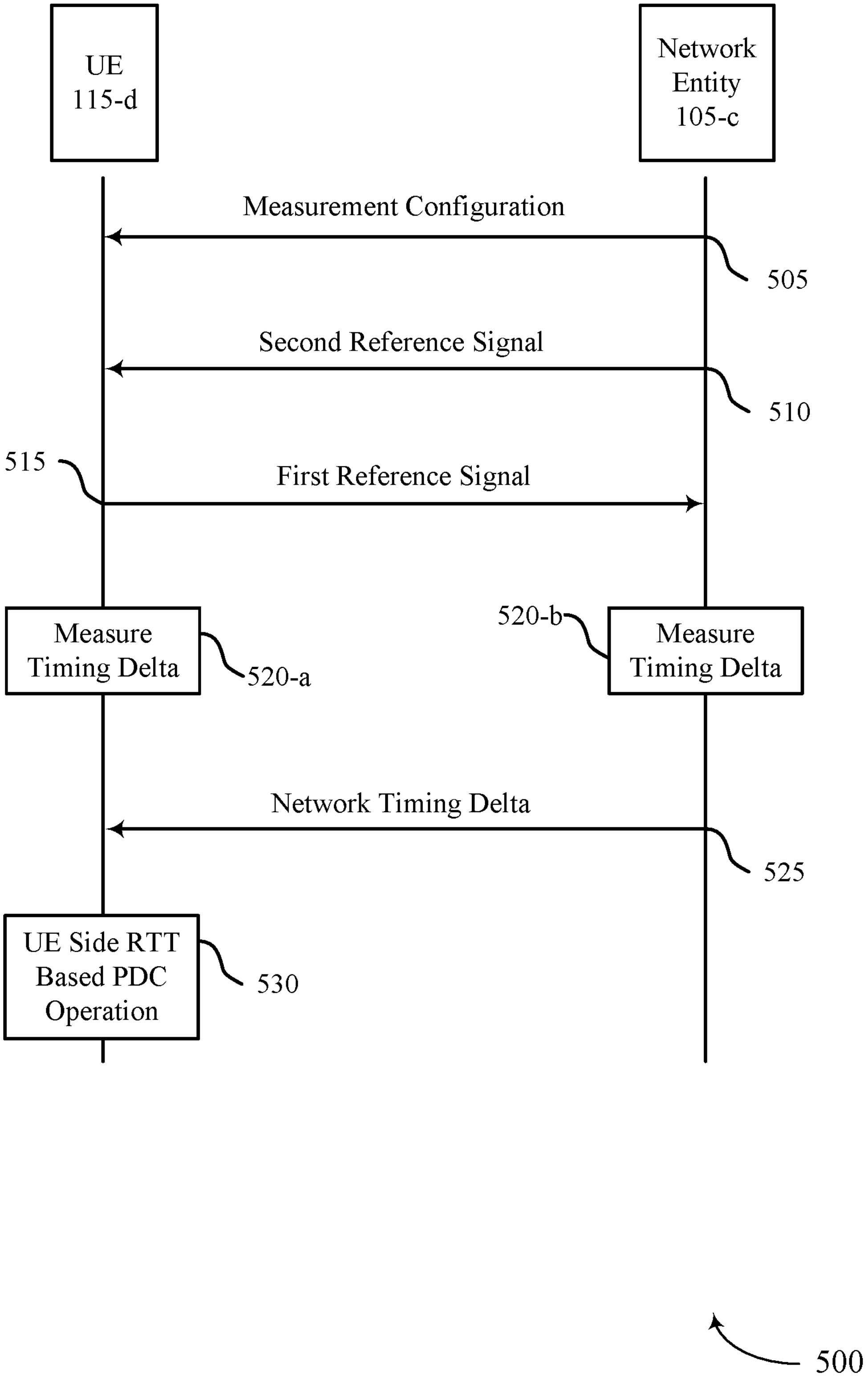
FIG. 5 shows an example of a process flow that supports PDC for limited band communications in accordance with one or more aspects of the present disclosure.

FIG. 5 shows an example of a process flow 500 that supports PDC for limited band communications in accordance with one or more aspects of the present disclosure. Aspects of the process flow 500 may implement, or be implemented by, aspects of the wireless communications system 100, the network architecture 200, the wireless communications system 300, and the process flow 400 as described herein with reference to FIGS. 1 through 4. For example, the process flow 500 may include a UE 115-*d* and a network entity 105-*c*, which may be examples of corresponding devices as described herein. The techniques described in the context of the process flow 500 may enable the UE 115-*d* to perform a UE side RTT based PDC operation for limited band communications (e.g., MTCs or NB-IoT communications).

At 505, the network entity 105-*c* may transmit a measurement configuration indicating one or more resources for a first reference signal (e.g., uplink reference signal) and a second reference signal (e.g., downlink reference signal) to be used to calculate (e.g., measure or estimate) respective timing deltas at the UE 115-*d* and the network entity 105-*c* as part of a RTT based operation (e.g., UE or network side). Such measurement configuration may include one or more control signals indicating resources for the first reference signal and the second reference signal to be used for estimation of the respective timing deltas.

In some examples, the UE 115-*d* may be performing, or otherwise operating in, MTCs. In such examples, the first reference signal (e.g., uplink reference signal) may be one of a SRS or a PRACH signal, while the second reference signal (e.g., downlink reference signal) may be one of a CRS or a PRS as described herein with reference to FIG. 4.

For example, if the second reference signal is a PRS, then the network entity 105-*a* may configure the PRS for the RTT based PDC operation via RRC signaling or a SIB, which may be separate from a PRS intended for positioning calculations configured by LPP. That is, the network entity 105-*c* may configure resources associated with the PRS for timing delta measurements via a RRC signal (e.g., measurement configuration) separate from resources associated with a PRS for positioning calculations.

In some examples, the first reference signal may be a PRACH signal. In such examples, the network entity 105-*c* may configure a PRACH for the RTT based PDC operation via a unicast RRC message for the connected (CONN) UE 115-*d*, which may be separate from a PRACH signal configured for the UE 115-*d* to perform an initial access procedure (e.g., RACH procedure). For example, a PRACH signal configured for initial access may have a TA (e.g., $N_{TA}$) set to zero (e.g., $N_{TA}=0$). However, to differentiate between the two PRACH signals, the network entity 105-*c* may configure the PRACH signal for the RTT based PDC operation with a TA (e.g., $N_{TA}$) that can be non-zero, where the TA for the PRACH signal may be based on the latest closed-loop commands from the network entity 105-*c* to the UE 115-*d*.

Further, the UE 115-*d* may use the UE-TA $$\left(\text{e.g., } N_{TA,adj}^{UE}\right)$$

as a common value for the PRACH configured for the RTT based PDC operation. Alternatively, the UE-TA $$\left(\text{e.g., } N_{TA,adj}^{UE}\right)$$

may be different or separately configured by the network entity 105-*c*. In such examples, the network entity 105-*c* may indicate to the UE 115-*d* which subframe the PRACH signal may be transmitted in in order for the UE 115-*d* to estimate the UE timing delta (e.g., estimation of the reception to transmission time difference). Further, the PRACH signal for the RTT based PDC operation may be a contention-free random access signal, which may use a (UE-specific) preamble index and mask index of the UE 115-*d* configured via an information element (e.g., RACH-ConfigDedicated) of a RACH signal from the network entity 105-*c*.

In some examples, the UE 115-*d* may be operating in CEmodeA. In such examples, the first reference signal may be one of a SRS or the PRACH signal. If the first reference signal is a SRS, then the network entity 105-*c* may configure the SRS for the RTT based PDC operation as a periodic transmission, an aperiodic transmission, or combination thereof, where the UE 115-*d* may transmit the SRS (e.g., first reference signal) via a normal uplink subframe, a special uplink subframe, or both.

Further, in examples when the first reference signal is a SRS, the network entity 105-*c* may enable or disable the resources for the SRS via RRC signaling. For example, whether to enable or disable periodic (SRS trigger type 0) SRSs, aperiodic (SRS trigger type 1) SRSs, or both in normal UL subframe (e.g., SoundingRS-UL-ConfigDedicated), in a special subframe (e.g., SoundingRS-UL-ConfigDedicatedUpPTsExt), or both, for PDC may be commonly or separately configured. That is, the network entity 105-*c* may configure multiple SRSs for the RTT based PDC operation, where a first portion of the multiple SRSs are periodic, while a second portion of the multiple SRS are aperiodic. Further, both the first portion and the second portion of the SRSs may be associated with normal uplink subframes, special uplink subframes, or a combination thereof. In such examples, the network entity 105-*c* may enable or disable the multiple SRSs (e.g., periodic and aperiodic SRSs) commonly (e.g., together) using a SRS information element (e.g., SoundingRS-UL-ConfigCommon) of the RRC signaling as detailed below:

```
SoundingRS-UL-ConfigCommon ::= CHOICE{
   usage DC       ENUMERATED {true}        OPTIONAL, -- Need R
}
```

Alternatively, the network entity 105-*c* may enable or disable the periodic SRSs (e.g., first portion) using a periodic SRS information element (e.g., SoundingRS-ConfigDedicated) of the RRC signaling as detailed below:

```
SoundingRS-UL-ConfigDedicated ::= CHOICE{
   usage DC       ENUMERATED {true}        OPTIONAL, -- Need R
}
```

Additionally, the network entity 105-*c* may enable or disable the aperiodic SRSs (e.g., second portion) using an aperiodic SRS information element (e.g., SoundingRS-ConfigDedicatedAperiodic) of the RRC signaling as detailed below:

```
SoundingRS-UL-ConfigDedicatedAperiodic ::= CHOICE{
   usage DC       ENUMERATED {true}        OPTIONAL, -- Need R
}
```

In this way, the network entity 105-*c* may configure, or otherwise allocate, resources for the first reference signal and the second reference signal for RTT based PDC operations via a measurement configuration, where the UE 115-*d* is performing MTCs.

In some examples, the UE 115-*d* may be performing, or otherwise operating in, NB-IoT communications. In such examples, the first reference signal (e.g., uplink reference signal) may be a NPRACH signal, while the second reference signal (e.g., downlink reference signal) may be one of a NPRS or NRS as described herein with reference to FIG. 4.

For example, if the second reference signal is a NPRS, then the network entity 105-*c* (e.g., serving cell) may configure the NPRS for the RTT based PDC operation via a unicast RRC message or a SIB separate from a NPRS for positioning configured by LPP. That is, the network entity 105-*c* may configure the NPRS for the RTT based PDC operation separately from a NPRS for positioning. In such examples, the network entity 105-*c* may configure an operation mode associated with the NPRS to be the same as an operation mode associated with the NB-IoT communications or the same as an operation mode for the NPRS configured by LPP. The network entity 105-*c* may configure the operation mode, carrier, sequence, identifier, or a combination thereof for the NPRS for the RTT based PDC operation via the unicast RRC message or SIB as detailed below:

```
NPRS-PDC-Info ::= SEQUENCE {
   operationModeInfoNPRS ENUMERATED { inband, standalone },
   nprs-carrier            CarrierFreq-NB-r14 OPTIONAL, -- Cond Standalone/Guardband
   nprsSequenceInfo     INTEGER (0..174) OPTIONAL, -- Cond Inband
   nprsID                INTEGER (0..4095) OPTIONAL, -- Cond NPRS-ID
      ...
}
```

Further, if the second reference signal is a NRS, the network entity 105-*c* may configure the NRS for the RTT based PDC operation to be associated with an anchor carrier, a non-anchor carrier, or both. That is, the UE 115-*d* and the network entity 105-*c* may use a NRS via the anchor carrier, the non-anchor carrier, or both, perform the RTT measurement (e.g., timing delta measurements). In such examples, the network entity 105-*c* (e.g., serving cell) may configure the same or different flag for the NRS in the anchor carrier as the NRS in the non-anchor carrier for the RTT based PDC operation. Further, the network entity 105-*c* may configure the NRS associated with the non-anchor carrier for the RTT based PDC operation independent from a NRS associated with a non-anchor carrier (e.g., nrs-NonAnchorConfig) for a paging carrier. That is, the network entity 105-*c* may configure the NRS in a non-anchor carrier for the RTT based PDC operation different from an NRS for a paging carrier. Further, because the UE 115-*d* may not be able to monitor more than one carrier at a time, the network entity 105-*c* may configure a time gap, such that the UE 115-*d* may retune to the anchor or the non-anchor carrier to detect the NRS for the RTT based PDC operation.

As described herein, for the RTT based PDC operation for NB-IoT communications, the first reference signal may be an example of a NPRACH signal. As such, the network entity 105-*c* may configure a NPRACH for the RTT based PDC operation via a unicast RRC message for the connected (CONN) UE 115-*d*, which may be separate from a NPRACH signal configured for the UE 115-*d* to perform an initial access procedure (e.g., RACH procedure). For example, a NPRACH signal configured for initial access may have a TA (e.g., $N_{TA}$) set to zero (e.g., $N_{TA}=0$). However, to differentiate between the two NPRACH signals, the network entity 105-*c* may configure the NPRACH signal for the RTT based PDC operation with a TA (e.g., $N_{TA}$) that can be non-zero, where the TA for the NPRACH signal may be based on the latest closed-loop commands from the network entity 105-*c* to the UE 115-*d*.

Further, the UE 115-*d* may use the UE-TA $$\left(\text{e.g., } N_{TA,adj}^{UE}\right)$$

as a common value for the NPRACH configured for the RTT based PDC operation. Alternatively, the UE-TA $$\left(\text{e.g., } N_{TA,adj}^{UE}\right)$$

may be different or separately configured by the network entity 105-*c*. In such examples, the network entity 105-*c* may indicate to the UE 115-*d* which subframe the NPRACH signal may be transmitted in in order for the UE 115-*d* to estimate the UE timing delta (e.g., estimation of the reception to transmission time difference). Further, the NPRACH signal for the RTT based PDC operation may be a contention-free random access signal, which may use a (UE-specific) preamble index and mask index of the UE 115-*d* configured via an information element (e.g., RACH-ConfigDedicated) of a RACH signal from the network entity 105-*c*.

In this way, the network entity 105-*c* may configure, or otherwise allocate, resources for the first reference signal and the second reference signal for RTT based PDC operations via a measurement configuration, where the UE 115-*d* is performing NB-IoT communications.

At 510, in accordance with the resources allocated via the measurement configuration, the network entity 105-*c* may transmit the second reference signal, while at 515, the UE 115-*d* may transmit the first reference signal. At 520-*a*, the UE 115-*d* may measure (e.g., calculate or estimate) a UE timing delta (e.g., timing delta associated with the UE 115-*d*), while, at 520-*b*, the network entity 105-*c* may measure (e.g., calculate or estimate) the network timing delta (e.g., timing delta associated with the network entity 105-*c*) in accordance with the techniques described herein with reference to FIG. 4.

At 525, the network entity 105-*c* may transmit the network timing delta to the UE 115-*d*. In some examples, the network entity 105-*c* may transmit the network timing delta to the UE 115-*d* via a unicast control message (e.g., such as a unicast control message 345). For example, the network entity 105-*c* may indicate that the UE 115-*d* is to perform a UE side RTT based PDC operation based on the operation field (e.g., ta-PDC) and the network timing delta being included in the unicast control message. That is, the network entity 105-*c* may implicitly indicate that the RTT based PDC operation is to be the UE side RTT based PDC operation by including the network timing delta (e.g., rxTxTimeDiff-eNB) via the unicast control message as described herein with reference to FIG. 3.

At 530, the UE 115-*d* may perform the UE side RTT based PDC operation. For example, the UE 115-*d* may calculate the RTT of an uplink transmission based on the UE timing delta and the network timing delta and compensate for the in order to meet the link budget of the clock synchronization service. For example, the UE 115-*d* may RTT transmit various uplink messages by considering the RTT of the communications between eh UE 115-*d* and the network entity 105-*c*, thereby enabling the UE 115-*d* to satisfy (e.g., meet) the link budget of the clock synchronization service.

Figure 6:
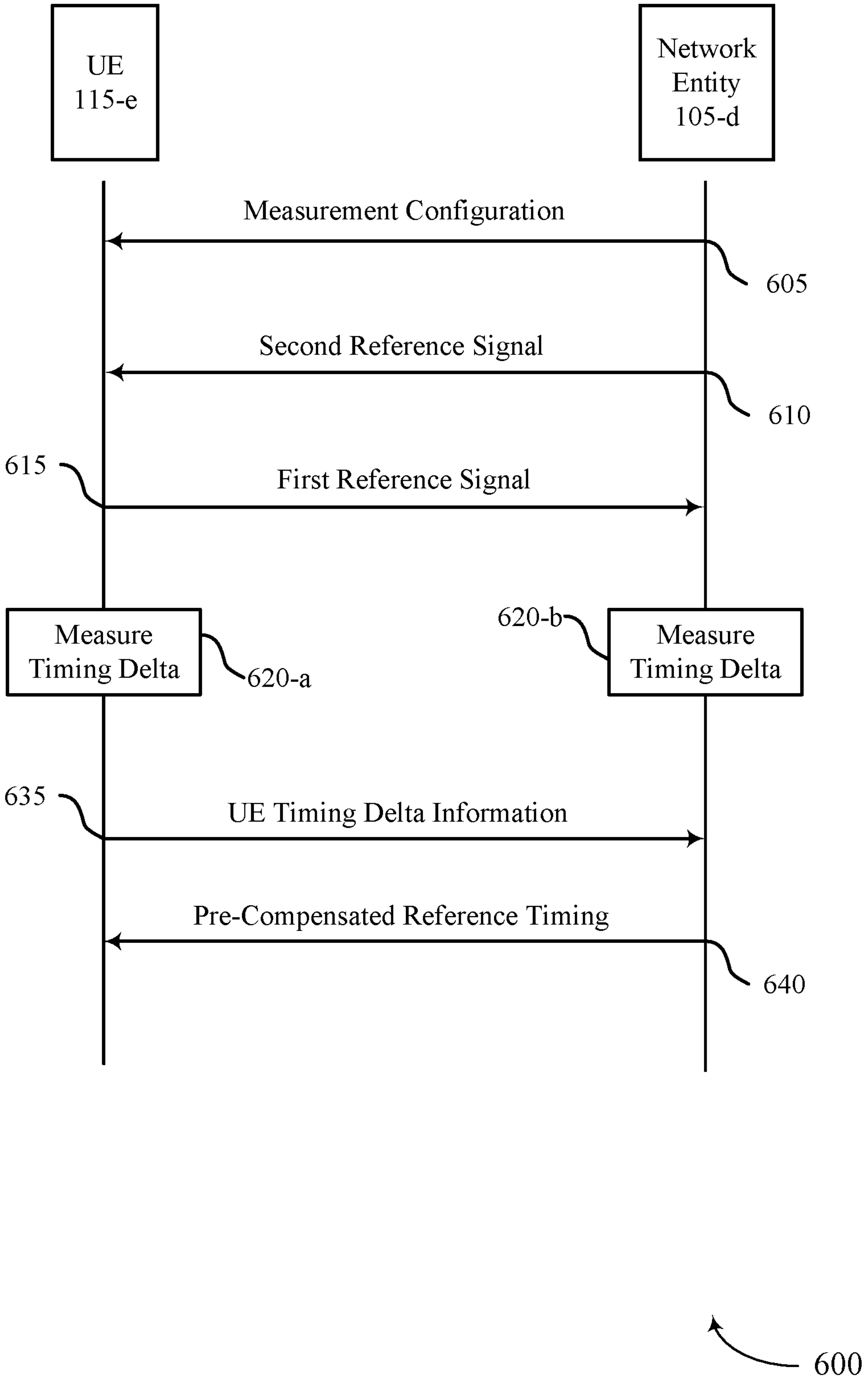
FIG. 6 shows an example of a process flow that supports PDC for limited band communications in accordance with one or more aspects of the present disclosure.

FIG. 6 shows an example of a process flow 600 that supports PDC for limited band communications in accordance with one or more aspects of the present disclosure. Aspects of the process flow 600 may implement, or be implemented by, aspects of the wireless communications system 100, the network architecture 200, the wireless communications system 300, the process flow 400, and the process flow 500 as described herein with reference to FIGS. 1 through 5. For example, the process flow 600 may include a UE 115-*e* and a network entity 105-*d*, which may be examples of corresponding devices as described herein. The techniques described in the context of the process flow 600 may enable the network entity 105-*d* to perform a network side RTT based PDC operation with a UE 115-*e* operating in limited band communications.

At 605, the network entity 105-*d* may transmit a measurement configuration allocating resources for a first reference signal and a second reference signal to be used to measure respective timing deltas at the UE 115-*e* and the network entity 105-*d*. In such examples, the measurement configuration may be an example of the measurement configuration as described herein with reference to FIG. 5. For example, the first reference signal and the second reference signal may be examples of the reference signal 405 and the reference signal 410 as described herein with reference to FIG. 4.

In some examples, the UE 115-*e* may be performing, or otherwise operating in, MTCs. In such examples, for network side RTT based PDC operations, the network entity 105-*d* may configure the UE 115-*e* to measure and report a UE timing delta (e.g., estimation of reception to transmission time difference at the service cell). For example, the network entity 105-*d* may configure resources for the second reference signal via a measurement object information element (e.g., measObjectRxTxDiff) of a unicast RRC message as detailed below:

```
MeasObjectToAddMod ::= SEQUENCE {
  MeasObject                                  MeasObject,
  MeasObject                                    CHOICE {
    measObjectEUTRA                           MeasObjectEUTRA,
    measObjectNR-r15                        MeasObjectNR-r15
    ...,
    measObjectRxTxDiff                        MeasObjectRxTxDiff,
  }
}
MeasObjectRxTxDiff ::=    SEQUENCE {
  dl-Ref-r17    CHOICE {
    crs-Ref       NULL,
    ...
  }                                         OPTIONAL, -- Need R
  ...
}
```

In such examples, the UE 115-*e* may use the indicated second reference signal to perform the corresponding UE timing delta measurement at 620-*a*.

In some other examples, the UE 115-*e* may be performing, or otherwise operating in, NB-IoT communications. In such examples, for network side RTT based PDC operations, the network entity 105-*d* may configure the UE 115-*e* to measure and report the UE timing delta (e.g., estimation of reception to transmission time difference at the service cell). For example, the network entity 105-*d* may configure resources for the second reference signal via a measurement object information element (e.g., measObjectRxTxDiff) of a unicast RRC message or by a measurement configuration element (e.g., ConnMeasConfig-NB) of a SIB message (e.g., SIB13-NB message) as detailed below:

```
ConnMeasConfig-NB-r17 ::= SEQUENCE {
  s-MeasureIntra-r17 NRSRP-Range-NB-r14,
  s-MeasureInter-r17 NRSRP-Range-NB-r14 OPTIONAL, -- Need OP
  neighCellMeasCriteria-r17          SEQUENCE {
    s-MeasureDeltaP-r17                ENUMERATED {dB6, dB9, dB12, dB15},
    t-MeasureDeltaP-r17                ENUMERATED {s15, s30, s45, s60}
  } OPTIONAL -- Need OR ...,
  measObjectRxTxDiff                   MeasObjectRxTxDiff,
}
MeasObjectRxTxDiff ::=    SEQUENCE {
```

-continued

```
  dl-Ref-r17        CHOICE {
    nrs-Ref           NULL,
    nprs-Ref              NULL,
    ...
  }                 OPTIONAL, -- Need R
  ...
}
```

In such examples, the UE 115-*e* may use the indicated second reference signal to perform the corresponding UE timing delta measurement at 620-*a*.

At 610, the network entity 105-*d* may transmit the second reference signal, while, at 615, the UE 115-*e* may transmit the first reference signal in accordance with the measurement configuration. At 620-*a* and 620-*b*, the network entity 105-*d* and the UE 115-*e* may measure (e.g., calculate or estimate) the network timing delta and the UE timing delta, respectively, using the first reference signal and the second reference signal using the techniques described herein with reference to FIG. 4.

At 635, based on measuring the UE timing delta, the UE 115-*e* may transmit the UE timing delta to the network entity 105-*d*. For example, the UE 115-*e* may receive, from the network entity 105-*d*, a unicast control message (e.g., such as a unicast control message 345) indicating that a RTT based PDC operation is to be performed for the limited band communications. In such examples, the network entity 105-*c* may set the operation field (e.g., ta-PDC) to deactivate and not include the network timing delta in the unicast control message, thereby indicating to the UE 115-*e* that network entity 105-*d* is to perform the network side RTT based PDC operation.

In some examples, for network side RTT based PDC operations, the UE 115-*e* may measure the timing delta at 620-*a* and report (e.g., transmit) the UE timing delta at 635 in accordance with a network configuration or autonomously. In one example, the network entity 105-*d* may configure the UE 115-*e* to periodically, semi-persistently, or aperiodically (e.g., based on a trigger) measure the UE timing delta and report the UE timing delta for the network side RTT based PDC operation. For example, the network entity 105-*d* may configure (e.g., transmit an indication of) a periodicity for transmission of the UE timing delta (e.g., PDC report) via the unicast control message (e.g., unicast control message 345) or a second unicast control message (e.g., second unicast RRC message). As such, the UE 115-*e* may measure and transmit the UE timing delta in accordance with the indicated periodicity.

In some other examples, the network entity may configure semi-persistent reporting of the UE timing delta with activation or deactivation of the reporting based on a MAC-CE (e.g., based on whether GNSS is supported or periodically not available for NTN IoT). That is, the network entity 105-*d* may transmit the unicast control message (e.g., via the unicast control message 345) or a second unicast control message indicating semi-persistent transmission of the measurement report. As such, the network entity 105-*d* may also transmit a MAC-CE activating or deactivating the measurement and transmission of the UE timing delta from the UE 115-*e*, where the UE 115-*e* may measure and report the UE timing delta in response to the MAC-CE. In some other examples, the network entity 105-*a* may transmit DCI to trigger the UE 115-*e* to measure and report the UE timing delta (e.g., aperiodic PDC report). In such examples, the network entity 105-*d* may transmit the DCI prior to expiration of a GNSS validation timer, before the UE 115-*e* begins to operate in an idle mode (e.g., such as RRC_INACTIVE mode), or both.

In another example, the UE 115-*e* may autonomously measure and transmit the UE timing delta for the network side RTT based PDC operation. In such examples, the UE 115-*e* may measure and transmit the UE timing delta in response to an unavailability of GNSS, expiration of a GNSS validation timer, or both.

Further, in some examples, the UE 115-*e* may autonomously measure and report the UE timing delta via a physical uplink shared channel (PUSCH) in response to a trigger event, where the trigger event may be configured, by the network entity 105-*d*, via a report configuration (e.g., reportConfig). For example, the network entity 105-*d* may configure a threshold to trigger the measurement and transmission of the UE timing delta. As an illustrative example, the network entity 105-*d* may configure the UE 115-*e* with a threshold duration of GNSS validation. As such, the UE 115-*e* may measure and report the UE timing delta based on a duration between the current operating time of the UE 115-*e* and a timestamp of the previous iteration (e.g., report) of the UE timing delta satisfying the threshold duration of GNSS validation. Such trigger event thresholds may be applicable to the UE 115-*e* in cases when eh UE 115-*e* is operating using MTCs (e.g., due to NB-IoT communications not supporting the reportConfig).

Additionally, or alternatively, the UE 115-*e* may autonomously transmit a scheduling request to report the UE timing delta measurements for the network side RTT based PDC operations. For example, the UE 115-*e* and the network entity 105-*e* may implement a scheduling request for RTT based PDC operations, which may be separate from other scheduling requests, such as the scheduling request for TAs (e.g., timingAdvanceSR). Further, in some examples, the UE 115-*e* may transmit a PDC timing delta MAC-CE (e.g., that includes greater than 12 bits for better TA-based granularity) to provide the network entity 105-*d* with an estimate of the UE timing delta. Such PDC timing delta MAC-Ce may be similar to, or the same as, the TA reporting MAC-CE for NTN MTC and NB-IoT communications. In some other examples, the UE 115-*e* may transmit the UE timing delta based on an offset threshold. For example, the network entity 105-*d* may configure the offset threshold, where the offset threshold may be the variation between the current (e.g., latest) UE timing delta and the last reported UE timing delta. As such, the UE 115-*e* may transmit the UE timing delta based on a difference between the current UE timing delta and the previous UE timing delta being greater than or equal to the offset threshold (e.g., offsetThresholdRxTxTimeDiff).

The UE 115-*e* may transmit the UE timing delta for network side RTT based PDC operations via various messages or information elements of control signals based on whether the UE 115-*e* is operating using MTCs or NB-IoT communications. For example, if the UE 115-*e* is performing, or otherwise operating in, MTCs, then the UE 115-*e* may be configured to report UE timing delta for the network side RTT based PDC operation separate from the reception to transmission time difference results for enhanced cell identification (ECID). For example, the UE 115-*e* may report the UE timing delta results (e.g., ue-RxTxTimeDiffResult) via an information element (e.g., MeasResultRxTxTimeDiff) of a measurement results information element (e.g., MeasResults) as detailed below:

```
MeasResults ::=                     SEQUENCE {
  ...
  measResultForECID-r9              MeasResultForECID-r9        OPTIONAL
  measResultRxTxTimeDiff              MeasResultRxTxTimeDiff      OPTIONAL,
}
MeasResultForECID-r9 ::=            SEQUENCE {
  ue-RxTxTimeDiffResult-r9                 INTEGER (0..4095),
  currentSFN-r9                     BIT STRING (SIZE (10))
}
MeasResultRxTxTimeDiff ::= SEQUENCE {
  ue-RxTxTimeDiffResult                    INTEGER (0..61565)
}
ReportConfigEUTRA ::=               SEQUENCE {
  ue-RxTxTimeDiffPeriodical-r9          ENUMERATED {setup}   OPTIONAL -- Need OR
```

In some examples, the UE 115-*e* may report the UE timing delta (e.g., result-k5-r17) with greater granularity using a timing delta information element (e.g., rxTxTimeDiff-ue-r17) of a measurement information element (e.g., MeasResultRxTxTimeDiff-r17) as detailed below:

```
MeasResults ::=                     SEQUENCE {
  ...
  measResultRxTxTimeDiff-r17        MeasResultRxTxTimeDiff-r17      OPTIONAL,
}
MeasResultRxTxTimeDiff-r17 ::= SEQUENCE {
  rxTxTimeDiff-ue-r17               RxTxTimeDiff-r17       OPTIONAL,
  ...
}
RxTxTimeDiff-r17 ::= SEQUENCE {
  result-k5-r17       INTEGER (0..61565)    OPTIONAL, -- Need N
  ...
}
```

Alternatively, if the UE 115-*e* is performing, or otherwise operating in, NB-IoT communications, then the UE 115-*e* may be configured to report the UE timing delta via an uplink information transfer element (e.g., ULInformationTransfer-NB). In such examples, the UE 115-*e* may not receive a report configuration (e.g., report-Config) for NB-IoT. The current uplink information transfer element (e.g., ULInformationTransfer-NB) for NB-IoT may not include security protection. As such, security enhancements may be needed if UE-specific time-related information is included. That is, the UE 115-*e* may transmit the UE timing delta (e.g., rxTxTimeDiff-ue) via a measurement information element (e.g., measResultRxTxTimeDiff) of the uplink information transfer element (e.g., ULInformationTransfer-NB) as detailed below:

```
ULInformationTransfer-NB-r13-IEs ::= SEQUENCE {
  dedicatedInfoNAS-r13                DedicatedInfoNAS,
  lateNonCriticalExtension            OCTET STRING          OPTIONAL,
  measResultRxTxTimeDiff                MeasResultRxTxTimeDiff   OPTIONAL,
  nonCriticalExtension              SEQUENCE { }          OPTIONAL
}
MeasResultRxTxTimeDiff ::= SEQUENCE {
  rxTxTimeDiff-ue       RxTxTimeDiff       OPTIONAL,
}
```

At 640, in response to receiving the measured UE timing delta, the network entity 105-*a* may perform the network side PDC operation. For example, the network entity 105-*d* may calculate the RTT of an uplink transmission based on the UE timing delta and the network timing delta in accordance with the techniques described herein with reference to FIG. 4. Based on the RTT, the network entity 105-*d* may transmit an indication of a pre-compensated reference timing, such that the UE 115-*e* may use, or otherwise apply, the pre-compensated reference timing for uplink transmissions in order to satisfy the link budget of the clock synchronization service.

Figure 7:
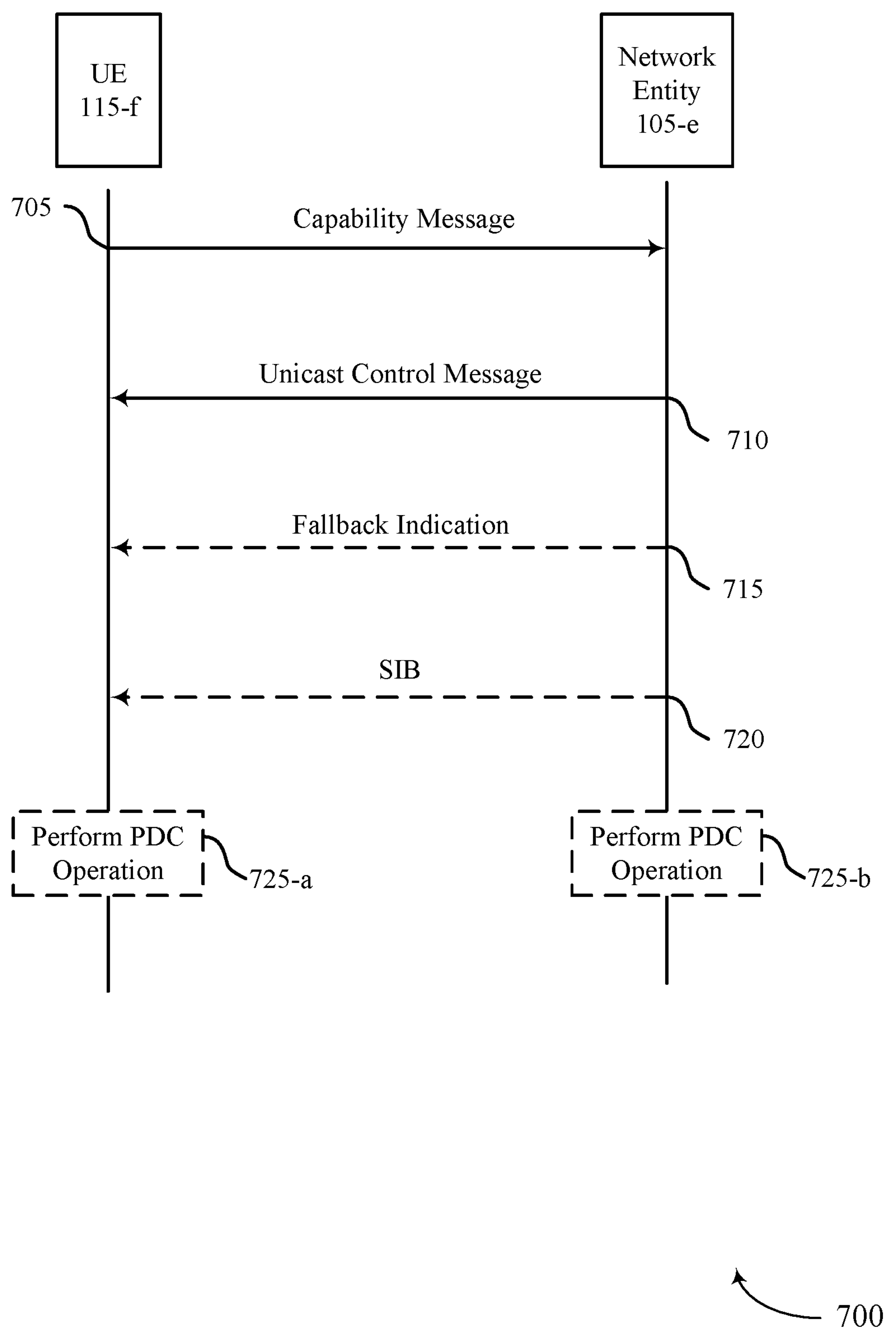
FIG. 7 shows an example of a process flow that supports PDC for limited band communications in accordance with one or more aspects of the present disclosure.

FIG. 7 shows an example of a process flow 700 that supports PDC for limited band communications in accordance with one or more aspects of the present disclosure. Aspects of the process flow 700 may implement, or be implemented by, aspects of the wireless communications system 100, the network architecture 200, the wireless communications system 300, the process flow 400, the process flow 500, and the process flow 600 as described herein with reference to FIGS. 1 through 6. For example, the process flow 700 may include a UE 115-*f* and a network entity 105-*e*, which may be examples of corresponding devices as described herein. The techniques described in the context of the process flow 700 may enable the network entity 105-*e* and the UE 115-*f* to perform TA based or RTT based PDC operations while the UE 115-*f* may be operating in limited band communications.

At 705, the UE 115-*f* may transmit a message (e.g., such as a capability message 335) indicative of a capability of the UE 115-*f* to perform one or more PDC operations for limited band communications, where the limited band communications may be associated with communications via a carrier having a carrier bandwidth below a threshold bandwidth (e.g., six RBs for MTCs or a single RB for NB-IoT communications). Further, the limited band communications associated with a link budget for a clock synchronization service as described herein with reference to FIG. 3.

At 710, the network entity 105-*e* may transmit a unicast control message (e.g., such as the unicast control message 345) that indicates a PDC operation of the one or more PDC operations for the limited band communications. The unicast control message may include a downlink information transfer element (e.g., DLlnformationTransfer or DLlnformationTransfer-NB), where such information element may include one or more pieces of information associated with the PDC operation, such as an operational field (e.g., ta-PDC), a network timing delta (e.g., rxTxTimeDiff-eNB), time reference information (timeReferencelnfo-r15), a TA indication (e.g., timingAdvancelndication), a fallback indication (e.g., sib16Fallbak), or a combination thereof as described herein with reference to FIG. 3.

At 715, the network entity 105-*e* may optionally set the fallback indication (e.g., sib16Fallback) of the unicast control message to true. As such, at 720, the UE 115-*f* may monitor for, and receive, a SIB indicating the time reference information associated with the PDC operation.

At 725-*a*, the UE 115-*f* may perform the PDC operation. In some examples, the UE 115-*f* may perform a TA based PDC operation in accordance with the TA indication of the unicast control message. For example, if the operation field of the unicast control message is set to activate (e.g., ta-PDC=activate), then the UE 115-*f* may perform the TA based PDC operation in accordance with the techniques described herein with reference to FIG. 3.

In some other examples, the UE 115-*f* may perform a UE side RTT based PDC operation in accordance with the network timing delta received via the unicast control message at 710. For example, if the operation field of the unicast control message is set to deactivate (e.g., ta-PDC=deactivate) and the network timing delta is included in the unicast control message, then the UE 115-*f* may perform the UE side RTT based PDC operation in accordance with the techniques described herein with reference to FIGS. 4 and 5.

At 725-*b*, the network entity 105-*e* may perform the PDC operation. For example, if the operation field of the unicast control message is set to deactivate (e.g., ta-PDC=deactivate) and the network timing delta is not included in the unicast control message, then the network entity 105-*e* may perform the network side RRTT based PDC operation in accordance with the techniques described herein with reference to FIGS. 4 and 6.

Figure 8:
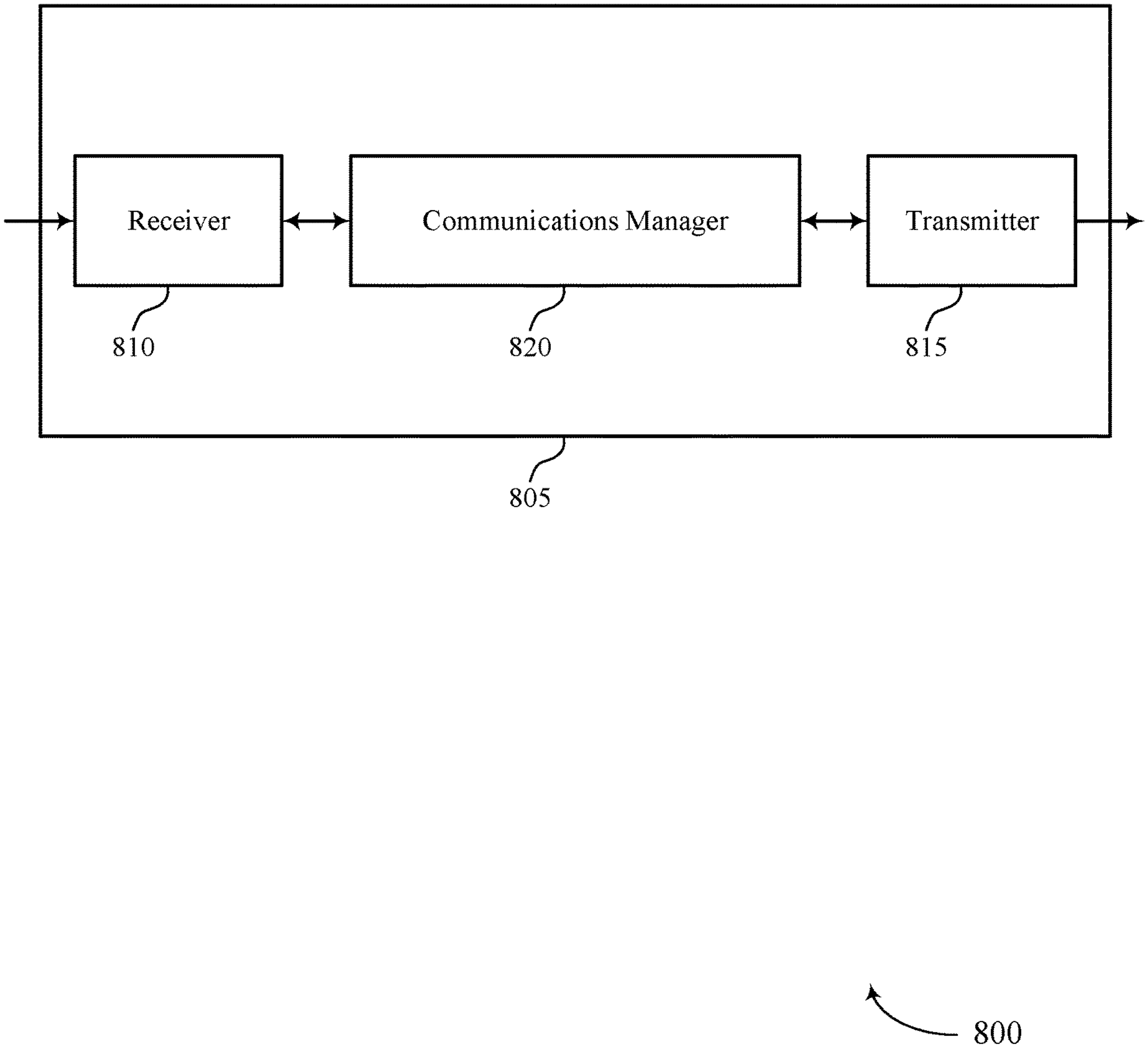
FIGS. 8 and 9 show block diagrams of devices that support PDC for limited band communications in accordance with one or more aspects of the present disclosure.

FIG. 8 shows a block diagram 800 of a device 805 that supports PDC for limited band communications in accordance with one or more aspects of the present disclosure. The device 805 may be an example of aspects of a UE 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to PDC for limited band communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to PDC for limited band communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of PDC for limited band communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include at least one processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, in some examples, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 is capable of, configured to, or operable to support a means for transmitting a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service. The communications manager 820 is capable of, configured to, or operable to support a means for receiving a unicast control message that indicates a PDC operation of the one or more PDC operations for the limited band communications by the UE. The communications manager 820 is capable of, configured to, or operable to support a means for performing the PDC operation for the limited band communications based on the unicast control message.

The communications manager 820 may be an example of means for performing various aspects of PDC operations for limited band communications as described herein. The communications manager 820, or its sub-components, may be implemented in hardware (e.g., in communications management circuitry). The circuitry may comprise of at least one processor, DSP, an ASIC, a FPGA or other programmable logic device, discrete gate or transistor logic, discrete hardware components, or any combination thereof designed to perform the functions described in the present disclosure.

In another implementation, the communications manager 820, or its sub-components, may be implemented in code (e.g., as communications management software or firmware) executed by at least one processor, or any combination thereof. If implemented in code executed by at least one processor, the functions of the communications manager 820, or its sub-components may be executed by a general-purpose processor, a DSP, an ASIC, a FPGA or other programmable logic device.

In some examples, the communication managers 820 may be configured to perform various operations (e.g., receiving, determining, transmitting) using or otherwise in cooperation with the receiver 810, the transmitter 815, or both.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for PDC operations in limited band communications, which may result in more efficient utilization of communication resources.

Figure 9:
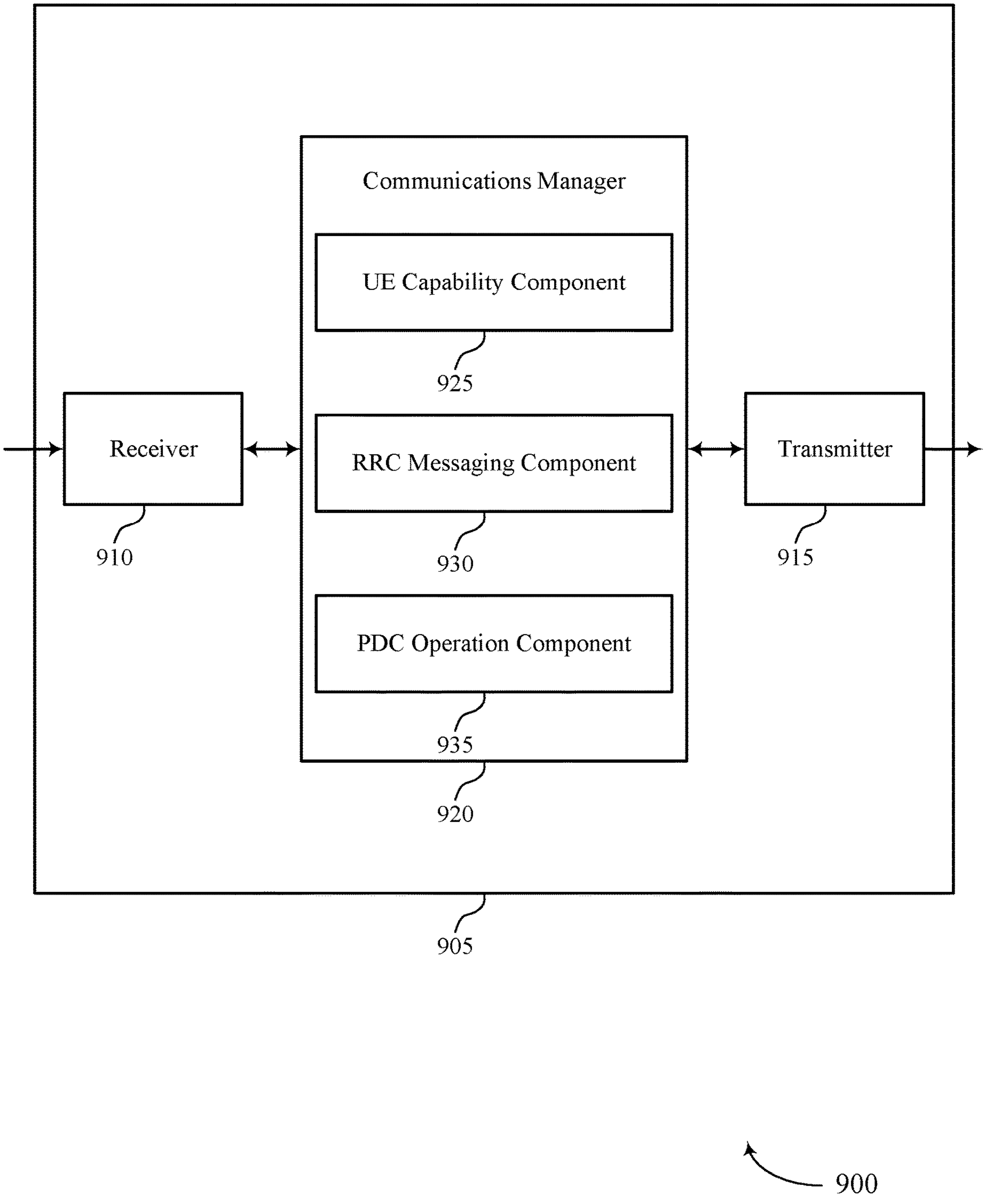

FIG. 9 shows a block diagram 900 of a device 905 that supports PDC for limited band communications in accordance with one or more aspects of the present disclosure. The device 905 may be an example of aspects of a device 805 or a UE 115 as described herein. The device 905 may include a receiver 910, a transmitter 915, and a communications manager 920. The device 905 may also include at least one processor. Each of these components may be in communication with one another (e.g., via one or more buses).

The receiver 910 may provide a means for receiving information such as packets, user data, control information, or any combination thereof associated with various information channels (e.g., control channels, data channels, information channels related to PDC for limited band communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to PDC for limited band communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of PDC for limited band communications as described herein. For example, the communications manager 920 may include a UE capability component 925, an RRC messaging component 930, a PDC operation component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The UE capability component 925 is capable of, configured to, or operable to support a means for transmitting a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service. The RRC messaging component 930 is capable of, configured to, or operable to support a means for receiving a unicast control message that indicates a PDC operation of the one or more PDC operations for the limited band communications by the UE. The PDC operation component 935 is capable of, configured to, or operable to support a means for performing the PDC operation for the limited band communications based on the unicast control message.

Figure 10:
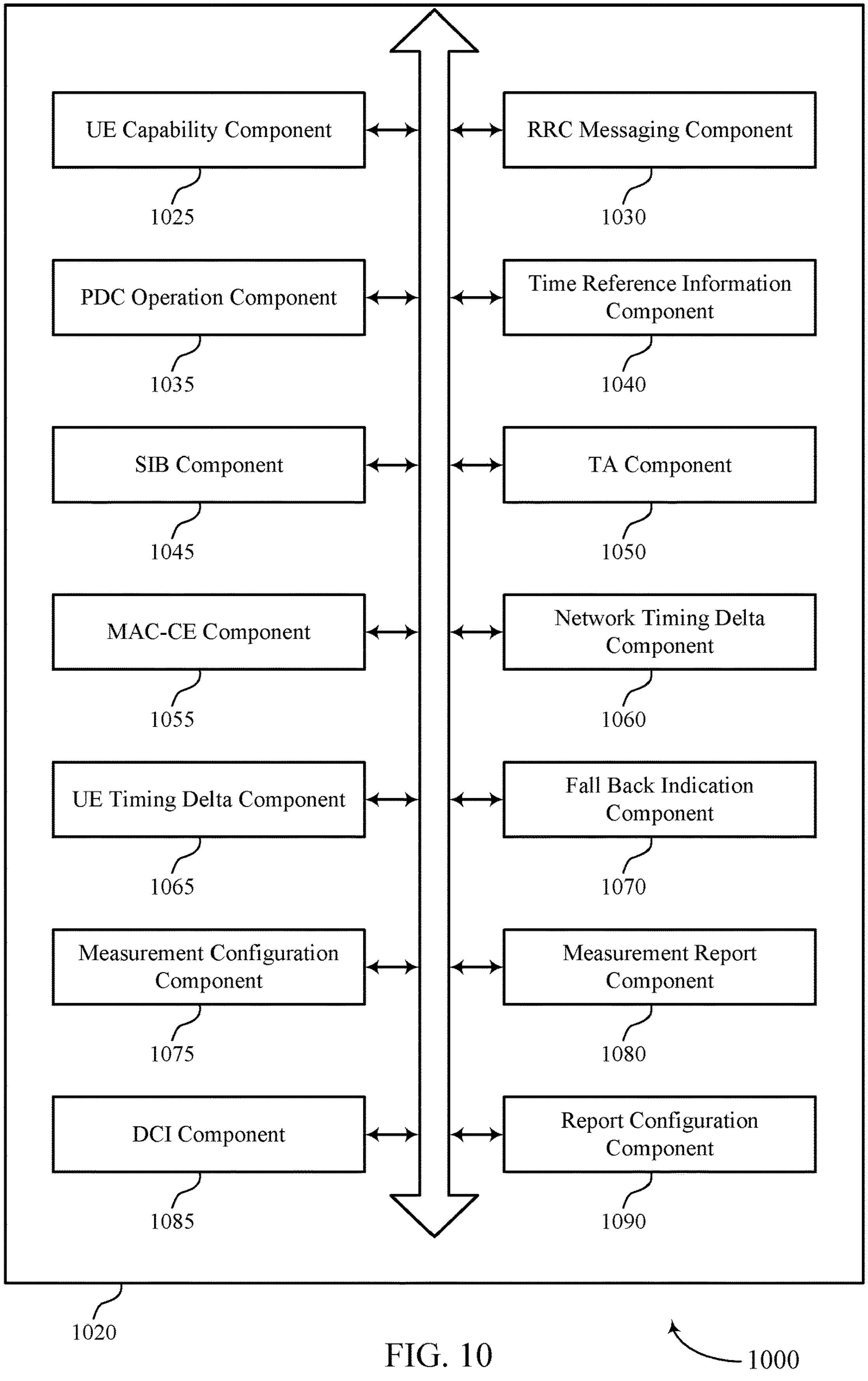
FIG. 10 shows a block diagram of a communications manager that supports PDC for limited band communications in accordance with one or more aspects of the present disclosure.

FIG. 10 shows a block diagram 1000 of a communications manager 1020 that supports PDC for limited band communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of PDC for limited band communications as described herein. For example, the communications manager 1020 may include a UE capability component 1025, an RRC messaging component 1030, a PDC operation component 1035, a time reference information component 1040, an SIB component 1045, a TA component 1050, a MAC-CE component 1055, a network timing delta component 1060, a UE timing delta component 1065, a fall back indication component 1070, a measurement configuration component 1075, a measurement report component 1080, a DCI component 1085, a report configuration component 1090, or any combination thereof. Each of these components may communicate, directly or indirectly, with one another (e.g., via one or more buses).

The communications manager 1020 may support wireless communications at a UE in accordance with examples as disclosed herein. The UE capability component 1025 is capable of, configured to, or operable to support a means for transmitting a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service. The RRC messaging component 1030 is capable of, configured to, or operable to support a means for receiving a unicast control message that indicates a PDC operation of the one or more PDC operations for the limited band communications by the UE. The PDC operation component 1035 is capable of, configured to, or operable to support a means for performing the PDC operation for the limited band communications based on the unicast control message.

In some examples, the time reference information component 1040 is capable of, configured to, or operable to support a means for receiving, as part of the unicast control message, time reference information associated with the one or more PDC operations, the PDC operation performed based on the time reference information.

In some examples, the SIB component 1045 is capable of, configured to, or operable to support a means for receiving, via a SIB message, time reference information associated with the one or more PDC operations, the PDC operation performed based on the time reference information.

In some examples, the fall back indication component 1070 is capable of, configured to, or operable to support a means for receiving, as part of the unicast control message, an indication to receive the time reference information via the SIB message, the time reference information via the SIB message received in accordance with the indication.

In some examples, the TA component 1050 is capable of, configured to, or operable to support a means for receiving, as part of the unicast control message, a timing advance indication associated with the PDC operation, the PDC operation performed based on the timing advance indication.

In some examples, the MAC-CE component 1055 is capable of, configured to, or operable to support a means for receiving a MAC-CE indicative of a timing advance indication, a size of the MAC-CE being greater than a threshold quantity of bits, the PDC operation performed based on the timing advance indication.

In some examples, the network timing delta component 1060 is capable of, configured to, or operable to support a means for receiving, as part of the unicast control message, a timing delta associated with a network entity, the PDC operation performed based on the timing delta associated with the network entity.

In some examples, the UE timing delta component 1065 is capable of, configured to, or operable to support a means for measuring a first timing delta associated with the UE, the first timing delta based on a transmission time of a first reference signal from the UE and a reception time of a second reference signal at the UE.

In some examples, the first reference signal is one of a SRS or a PRACH signal and the second reference signal is one of a CRS or a PRS, the first reference signal is based on a mode of operation at the UE.

In some examples, the first reference signal is a NPRACH signal and the second reference signal is one of a NPRS or a NRS.

In some examples, the measurement configuration component 1075 is capable of, configured to, or operable to support a means for receiving a measurement configuration indicative of one or more resources for the second reference signal, the second reference signal being for measurement of the first timing delta associated with the UE.

In some examples, the measurement report component 1080 is capable of, configured to, or operable to support a means for transmitting a measurement report that includes the first timing delta associated with the UE, the PDC operation performed based on transmission of the measurement report.

In some examples, the RRC messaging component 1030 is capable of, configured to, or operable to support a means for receiving a second unicast control message that indicates a periodicity associated with transmission of the measurement report, the measurement report transmitted in accordance with the periodicity.

In some examples, the RRC messaging component 1030 is capable of, configured to, or operable to support a means for receiving a second unicast control message that indicates a configuration associated with a semi-persistent transmission of the measurement report. In some examples, the MAC-CE component 1055 is capable of, configured to, or operable to support a means for receiving a MAC-CE that activates or deactivates the semi-persistent transmission of the measurement report in accordance with the configuration.

In some examples, the DCI component 1085 is capable of, configured to, or operable to support a means for receiving DCI that triggers the UE to transmit the measurement report, the measurement report transmitted in response to reception of the DCI.

In some examples, the report configuration component 1090 is capable of, configured to, or operable to support a means for receiving a report configuration that indicates a timing delta threshold, the measurement report transmitted in response to satisfaction of the timing delta threshold by the first timing delta associated with the UE.

In some examples, the measurement report is in response to a difference between the first timing delta associated with the UE and a second timing delta associated with the UE satisfying a threshold, the second timing delta is measured prior to the first timing delta.

In some examples, the one or more PDC operations to include a timing advance based operation, a round trip time based operation, or both.

In some examples, the limited band communications to include one of MTC or NB-IoTs communications.

In some examples, the one or more PDC operations are separately configured for a TN and a NTN.

Figure 11:
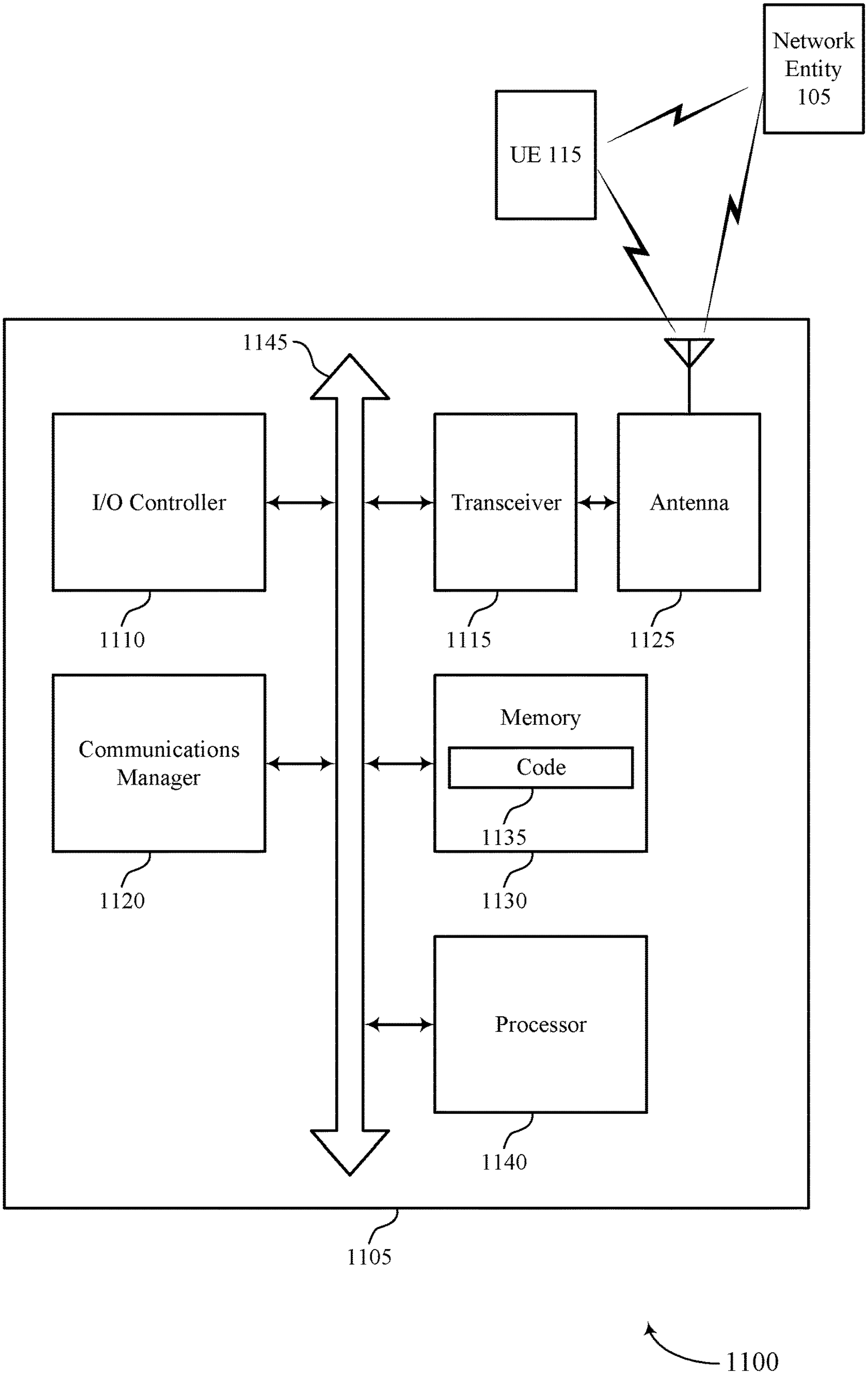
FIG. 11 shows a diagram of a system including a device that supports PDC for limited band communications in accordance with one or more aspects of the present disclosure.

FIG. 11 shows a diagram of a system 1100 including a device 1105 that supports PDC for limited band communications in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting PDC for limited band communications). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 is capable of, configured to, or operable to support a means for transmitting a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service. The communications manager 1120 is capable of, configured to, or operable to support a means for receiving a unicast control message that indicates a PDC operation of the one or more PDC operations for the limited band communications by the UE. The communications manager 1120 is capable of, configured to, or operable to support a means for performing the PDC operation for the limited band communications based on the unicast control message.

By including or configuring the communications manager 1120 in accordance with examples as described herein, the device 1105 may support techniques for PDC operations in limited band communications, which may result in reduced latency, more efficient utilization of communication resources, improved coordination between devices, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of PDC for limited band communications as described herein, or the processor 1140 and the memory 1130 may be otherwise configured to perform or support such operations.

Figure 12:
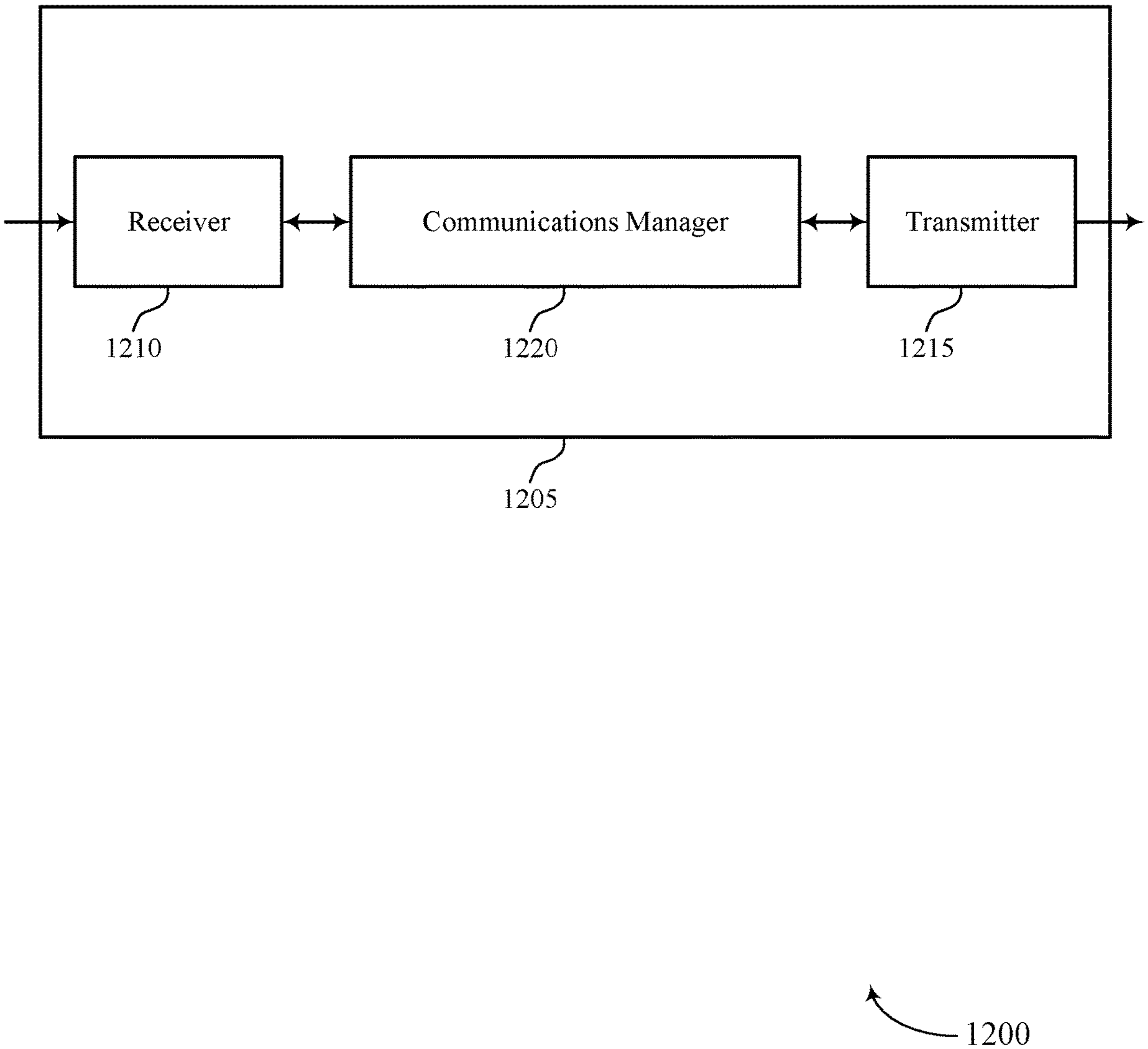
FIGS. 12 and 13 show block diagrams of devices that support PDC for limited band communications in accordance with one or more aspects of the present disclosure.

FIG. 12 shows a block diagram 1200 of a device 1205 that supports PDC for limited band communications in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of PDC for limited band communications as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include at least one processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, in some examples, the communications manager 1220, the receiver 1210, the transmitter 1215, or various combinations or components thereof may be implemented in code (e.g., as communications management software or firmware) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. For example, the communications manager 1220 is capable of, configured to, or operable to support a means for obtaining a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service. The communications manager 1220 is capable of, configured to, or operable to support a means for outputting a unicast control message that indicates a PDC operation of the one or more PDC operations for the limited band communications by the UE. The communications manager 1220 is capable of, configured to, or operable to support a means for performing the PDC operation for the limited band communications based on the unicast control message.

The communications manager 1220 may be an example of means for performing various aspects of PDC operations for limited band communications as described herein. The communications manager 1220, or its sub-components, may be implemented in hardware (e.g., in communications management circuitry). The circuitry may comprise of at least one processor, DSP, an ASIC, a FPGA or other programmable logic device, discrete gate or transistor logic, discrete hardware components, or any combination thereof designed to perform the functions described in the present disclosure.

In another implementation, the communications manager 1220, or its sub-components, may be implemented in code (e.g., as communications management software or firmware) executed by at least one processor, or any combination thereof. If implemented in code executed by at least one processor, the functions of the communications manager 1220, or its sub-components may be executed by a general-purpose processor, a DSP, an ASIC, a FPGA or other programmable logic device.

In some examples, the communication managers 1220 may be configured to perform various operations (e.g., receiving, determining, transmitting) using or otherwise in cooperation with the receiver 1210, the transmitter 1215, or both.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for PDC operations in limited band communications, which may result in more efficient utilization of communication resources.

Figure 13:
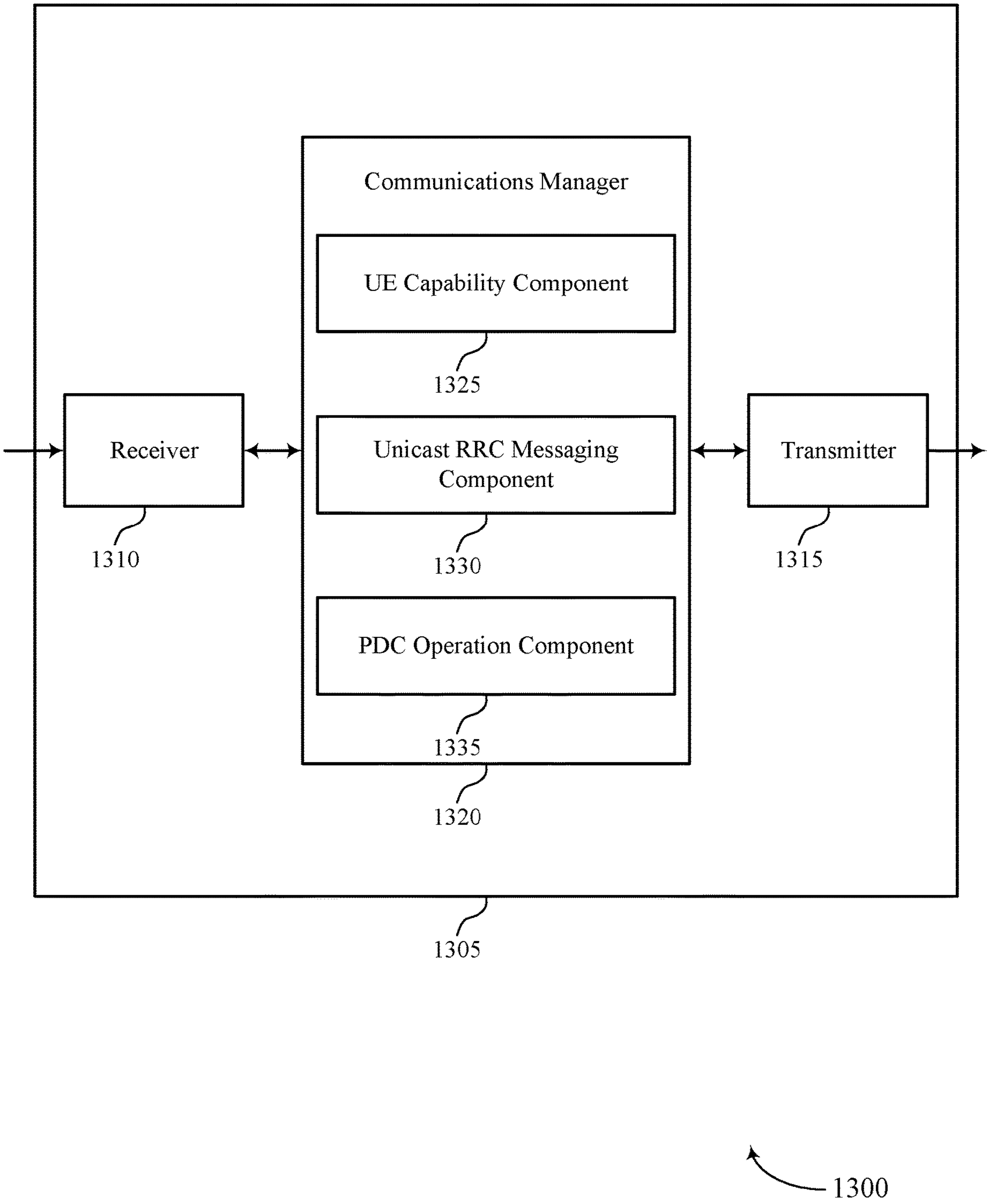

FIG. 13 shows a block diagram 1300 of a device 1305 that supports PDC for limited band communications in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include at least one processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of PDC for limited band communications as described herein. For example, the communications manager 1320 may include a UE capability component 1325, a unicast RRC messaging component 1330, a PDC operation component 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. The UE capability component 1325 is capable of, configured to, or operable to support a means for obtaining a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service. The unicast RRC messaging component 1330 is capable of, configured to, or operable to support a means for outputting a unicast control message that indicates a PDC operation of the one or more PDC operations for the limited band communications by the UE. The PDC operation component 1335 is capable of, configured to, or operable to support a means for performing the PDC operation for the limited band communications based on the unicast control message.

Figure 14:
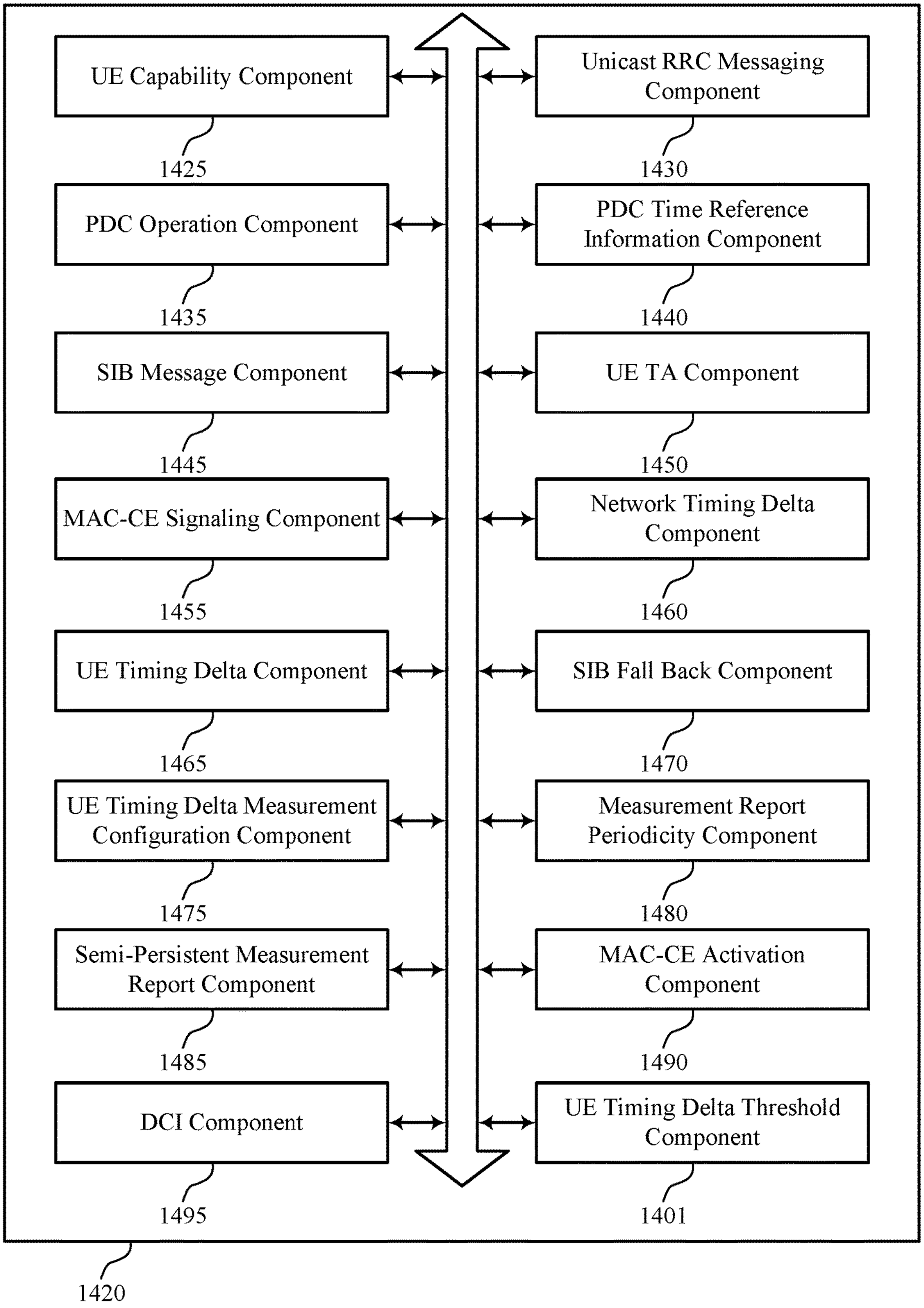
FIG. 14 shows a block diagram of a communications manager that supports PDC for limited band communications in accordance with one or more aspects of the present disclosure.

FIG. 14 shows a block diagram 1400 of a communications manager 1420 that supports PDC for limited band communications in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of PDC for limited band communications as described herein. For example, the communications manager 1420 may include a UE capability component 1425, a unicast RRC messaging component 1430, a PDC operation component 1435, a PDC time reference information component 1440, an SIB message component 1445, a UE TA component 1450, a MAC-CE signaling component 1455, a network timing delta component 1460, a UE timing delta component 1465, an SIB fall back component 1470, a UE timing delta measurement configuration component 1475, a measurement report periodicity component 1480, a semi-persistent measurement report component 1485, a MAC-CE activation component 1490, a DCI component 1495, a UE timing delta threshold component 1401, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications at a network entity in accordance with examples as disclosed herein. The UE capability component 1425 is capable of, configured to, or operable to support a means for obtaining a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service. The unicast RRC messaging component 1430 is capable of, configured to, or operable to support a means for outputting a unicast control message that indicates a PDC operation of the one or more PDC operations for the limited band communications by the UE. The PDC operation component 1435 is capable of, configured to, or operable to support a means for performing the PDC operation for the limited band communications based on the unicast control message.

In some examples, the PDC time reference information component 1440 is capable of, configured to, or operable to support a means for outputting, as part of the unicast control message, time reference information associated with the one or more PDC operations, the PDC operation performed based on the time reference information.

In some examples, the SIB message component 1445 is capable of, configured to, or operable to support a means for outputting, via a SIB message, time reference information associated with the one or more PDC operations, the PDC operation performed based on the time reference information.

In some examples, the SIB fall back component 1470 is capable of, configured to, or operable to support a means for outputting, as part of the unicast control message, an indication to receive the time reference information via the SIB message, reception of the time reference information via the SIB message is in accordance with the indication.

In some examples, the UE TA component 1450 is capable of, configured to, or operable to support a means for outputting, as part of the unicast control message, a timing advance indication associated with the PDC operation, the PDC operation performed based on the timing advance indication.

In some examples, the MAC-CE signaling component 1455 is capable of, configured to, or operable to support a means for outputting a MAC-CE indicative of a timing advance indication, a size of the MAC-CE being greater than a threshold quantity of bits, the PDC operation performed based on the timing advance indication.

In some examples, the network timing delta component 1460 is capable of, configured to, or operable to support a means for outputting, as part of the unicast control message, a timing delta associated with the network entity, the PDC operation performed based on the timing delta associated with the network entity.

In some examples, the UE timing delta component 1465 is capable of, configured to, or operable to support a means for obtaining measurement report that includes a first timing delta associated with the UE, the first timing delta based on a transmission time of a first reference signal from the UE and a reception time of a second reference signal at the UE.

In some examples, the first reference signal is one of a SRS or a PRACH signal and the second reference signal is one of a CRS or a PRS, the first reference signal is based on a mode of operation at the UE.

In some examples, the first reference signal is a NPRACH signal and the second reference signal is one of a NPRS or a NRS.

In some examples, the UE timing delta measurement configuration component 1475 is capable of, configured to, or operable to support a means for outputting a measurement configuration indicative of one or more resources for the second reference signal, the second reference signal being for measurement of the first timing delta associated with the UE.

In some examples, the measurement report periodicity component 1480 is capable of, configured to, or operable to support a means for outputting a second unicast control message that indicates a periodicity associated with transmission of the measurement report at the UE, the measurement report obtained in accordance with the periodicity.

In some examples, the semi-persistent measurement report component 1485 is capable of, configured to, or operable to support a means for outputting a second unicast control message that indicates a configuration associated with a semi-persistent transmission of the measurement report. In some examples, the MAC-CE activation component 1490 is capable of, configured to, or operable to support a means for outputting a MAC-CE that activates or deactivates the semi-persistent transmission of the measurement report in accordance with the configuration.

In some examples, the DCI component 1495 is capable of, configured to, or operable to support a means for outputting DCI that triggers the UE to transmit the measurement report, the measurement report obtained in response to output of the DCI.

In some examples, the UE timing delta threshold component 1401 is capable of, configured to, or operable to support a means for outputting a report configuration that indicates a timing delta threshold, the measurement report obtained in response to satisfaction of the timing delta threshold by the first timing delta associated with the UE.

In some examples, the measurement report is in response to a difference between the first timing delta associated with the UE and a second timing delta associated with the UE satisfying a threshold, the second timing delta measured prior to the first timing delta associated with the UE.

In some examples, the one or more PDC operations to include a timing advance based operation, a round trip time based operation, or both.

In some examples, the limited band communications to include one of MTC or NB-IoTs communications.

In some examples, the one or more PDC operations are separately configured for a TN and a NTN.

Figure 15:
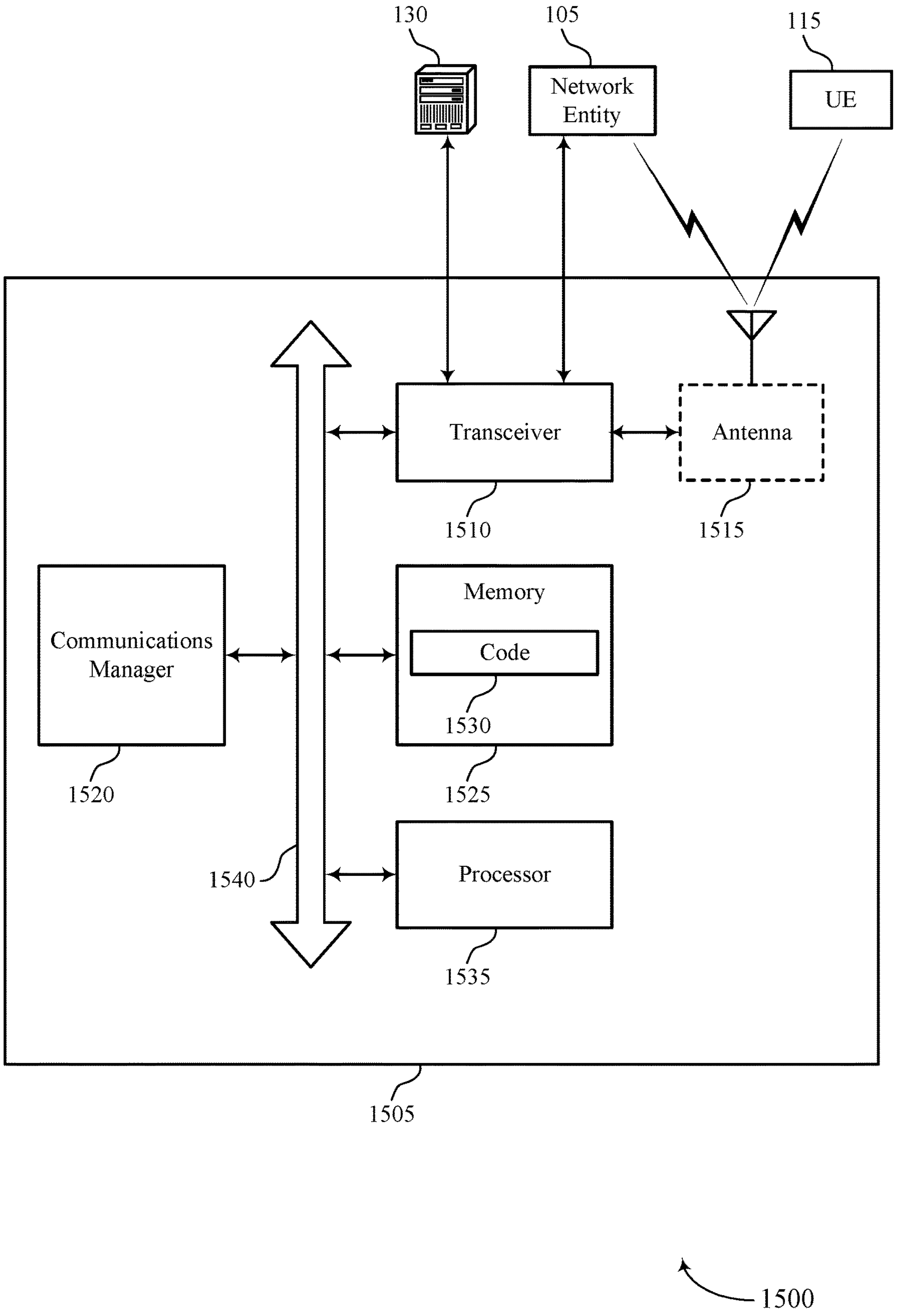
FIG. 15 shows a diagram of a system including a device that supports PDC for limited band communications in accordance with one or more aspects of the present disclosure.

FIG. 15 shows a diagram of a system 1500 including a device 1505 that supports PDC for limited band communications in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting PDC for limited band communications). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications at a network entity in accordance with examples as disclosed herein. For example, the communications manager 1520 is capable of, configured to, or operable to support a means for obtaining a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service. The communications manager 1520 is capable of, configured to, or operable to support a means for outputting a unicast control message that indicates a PDC operation of the one or more PDC operations for the limited band communications by the UE. The communications manager 1520 is capable of, configured to, or operable to support a means for performing the PDC operation for the limited band communications based on the unicast control message.

By including or configuring the communications manager 1520 in accordance with examples as described herein, the device 1505 may support techniques for PDC operations in limited band communications, which may result in reduced latency, more efficient utilization of communication resources, and improved coordination between devices.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of PDC for limited band communications as described herein, or the processor 1535 and the memory 1525 may be otherwise configured to perform or support such operations.

Figure 16:
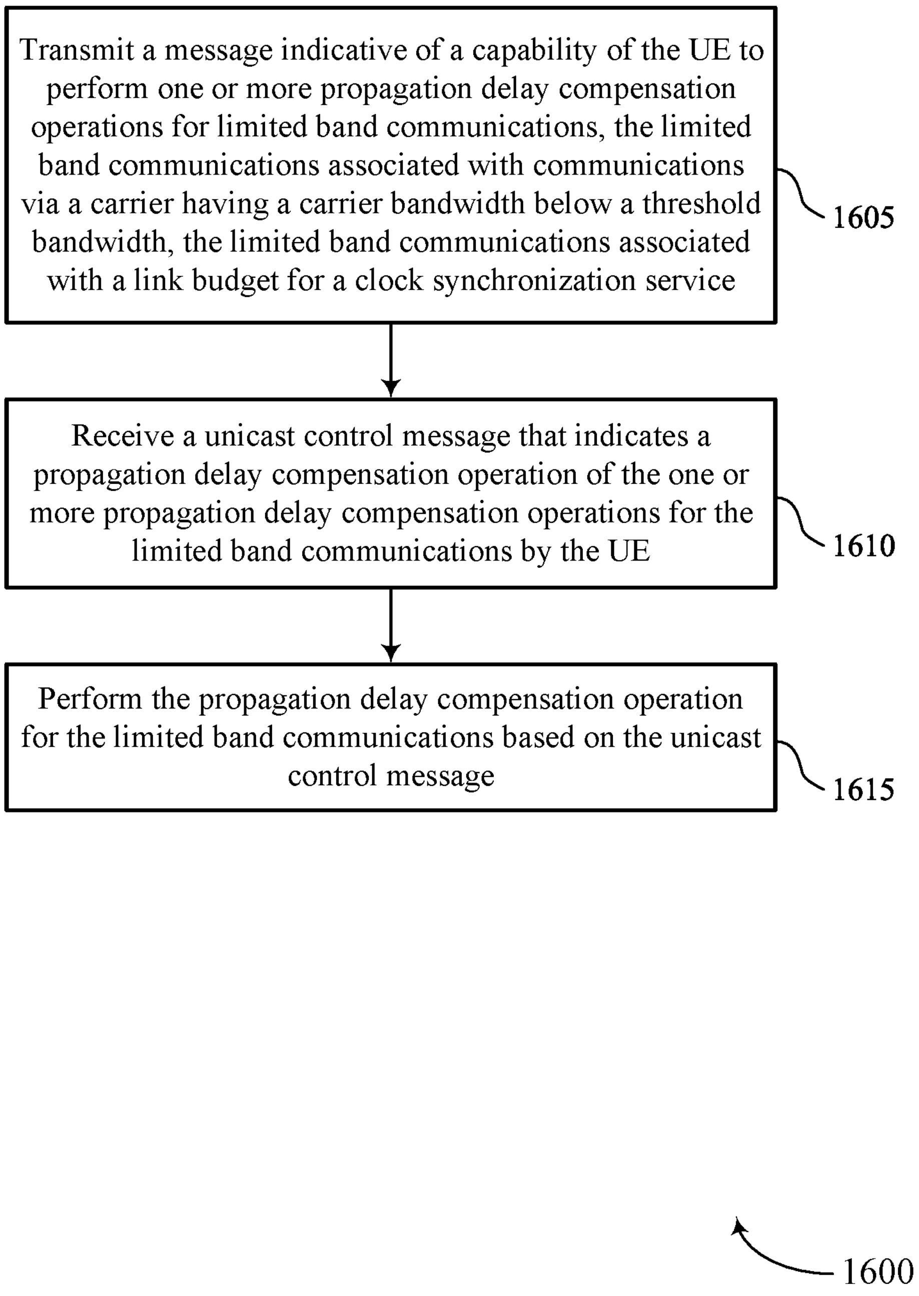
FIGS. 16 through 19 show flowcharts illustrating methods that support PDC for limited band communications in accordance with one or more aspects of the present disclosure.

FIG. 16 shows a flowchart illustrating a method 1600 that supports PDC for limited band communications in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the wireless UE to perform the described functions. Additionally, or alternatively, the wireless UE may perform aspects of the described functions using special-purpose hardware.

At 1605, the method may include transmitting a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service. The operations of 1605 may be performed in accordance with examples as disclosed herein. In some examples, aspects of the operations of 1605 may be performed by a UE capability component 1025 as described with reference to FIG. 10.

At 1610, the method may include receiving a unicast control message that indicates a PDC operation of the one or more PDC operations for the limited band communications by the UE. The operations of 1610 may be performed in accordance with examples as disclosed herein. In some examples, aspects of the operations of 1610 may be performed by an RRC messaging component 1030 as described with reference to FIG. 10.

At 1615, the method may include performing the PDC operation for the limited band communications based on the unicast control message. The operations of 1615 may be performed in accordance with examples as disclosed herein. In some examples, aspects of the operations of 1615 may be performed by a PDC operation component 1035 as described with reference to FIG. 10.

Figure 17:
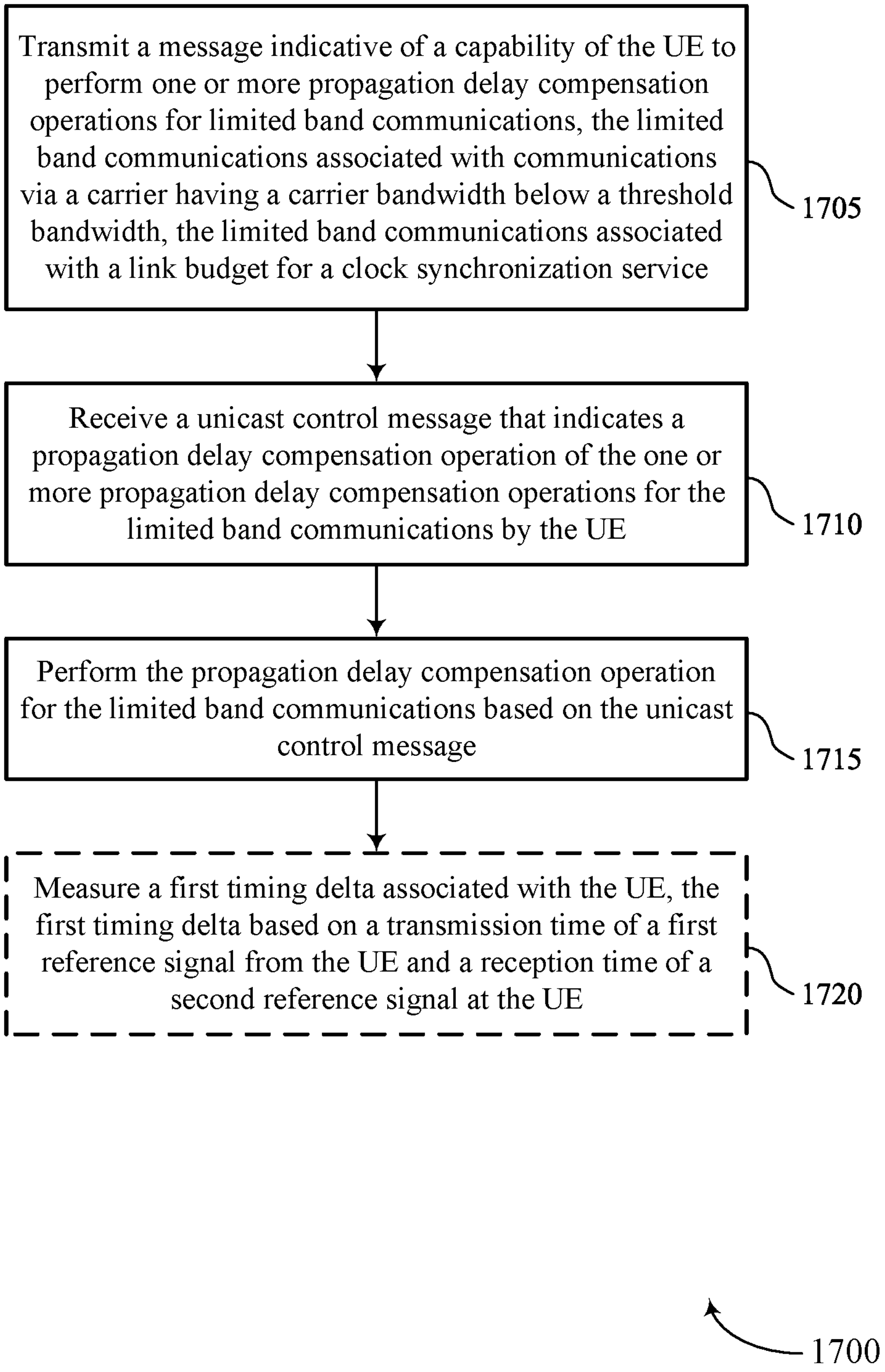

FIG. 17 shows a flowchart illustrating a method 1700 that supports PDC for limited band communications in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the wireless UE to perform the described functions. Additionally, or alternatively, the wireless UE may perform aspects of the described functions using special-purpose hardware.

At 1705, the method may include transmitting a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service. The operations of 1705 may be performed in accordance with examples as disclosed herein. In some examples, aspects of the operations of 1705 may be performed by a UE capability component 1025 as described with reference to FIG. 10.

At 1710, the method may include receiving a unicast control message that indicates a PDC operation of the one or more PDC operations for the limited band communications by the UE. The operations of 1710 may be performed in accordance with examples as disclosed herein. In some examples, aspects of the operations of 1710 may be performed by an RRC messaging component 1030 as described with reference to FIG. 10.

At 1715, the method may include performing the PDC operation for the limited band communications based on the unicast control message. The operations of 1715 may be performed in accordance with examples as disclosed herein. In some examples, aspects of the operations of 1715 may be performed by a PDC operation component 1035 as described with reference to FIG. 10.

At 1720, the method may include measuring a first timing delta associated with the UE, the first timing delta based on a transmission time of a first reference signal from the UE and a reception time of a second reference signal at the UE. The operations of 1720 may be performed in accordance with examples as disclosed herein. In some examples, aspects of the operations of 1720 may be performed by a UE timing delta component 1065 as described with reference to FIG. 10.

Figure 18:
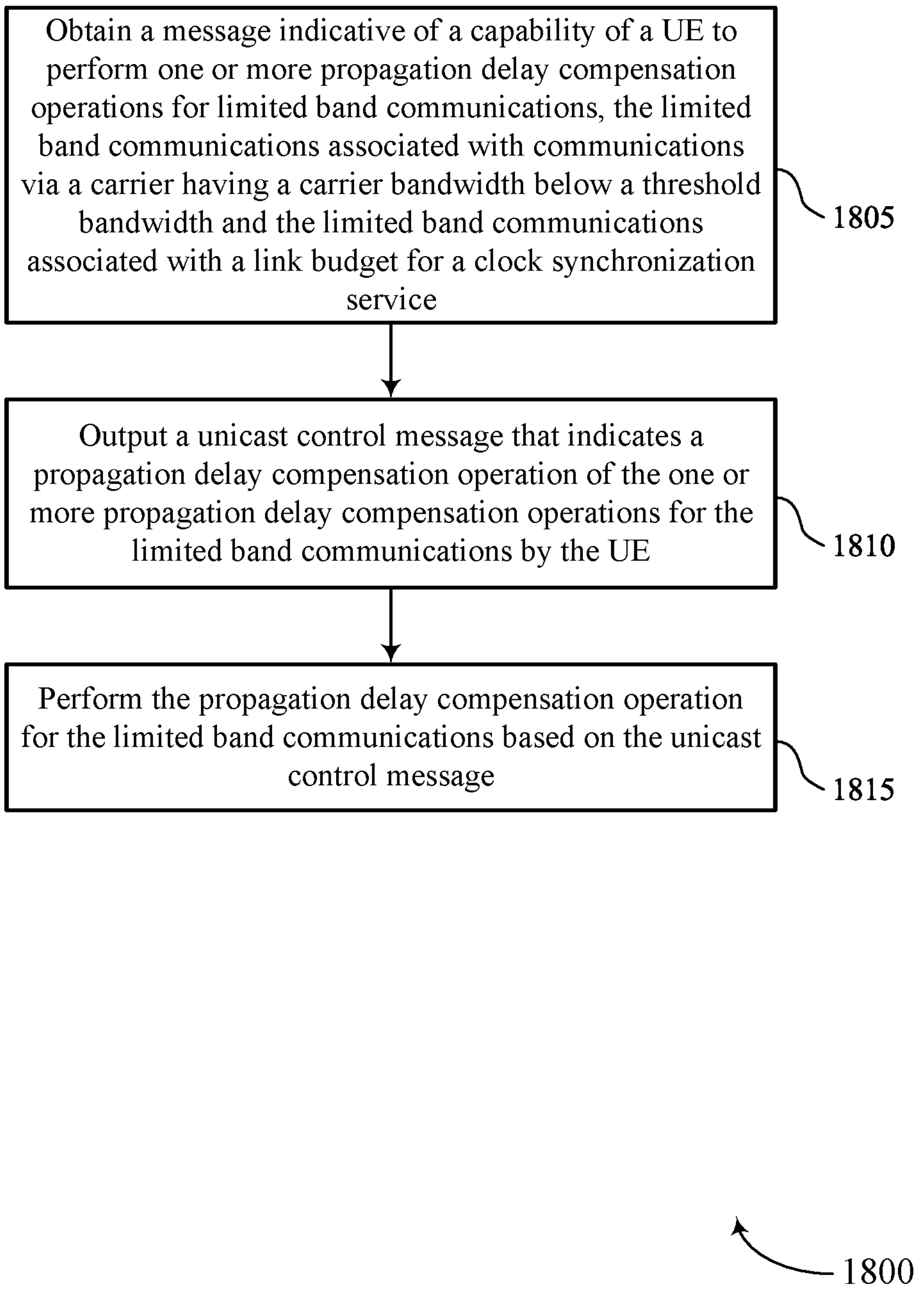

FIG. 18 shows a flowchart illustrating a method 1800 that supports PDC for limited band communications in accordance with aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the wireless network entity to perform the described functions. Additionally, or alternatively, the wireless network entity may perform aspects of the described functions using special-purpose hardware.

At 1805, the method may include obtaining a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service. The operations of 1805 may be performed in accordance with examples as disclosed herein. In some examples, aspects of the operations of 1805 may be performed by a UE capability component 1425 as described with reference to FIG. 14.

At 1810, the method may include outputting a unicast control message that indicates a PDC operation of the one or more PDC operations for the limited band communications by the UE. The operations of 1810 may be performed in accordance with examples as disclosed herein. In some examples, aspects of the operations of 1810 may be performed by a unicast RRC messaging component 1430 as described with reference to FIG. 14.

At 1815, the method may include performing the PDC operation for the limited band communications based on the unicast control message. The operations of 1815 may be performed in accordance with examples as disclosed herein.

In some examples, aspects of the operations of 1815 may be performed by a PDC operation component 1435 as described with reference to FIG. 14.

Figure 19:
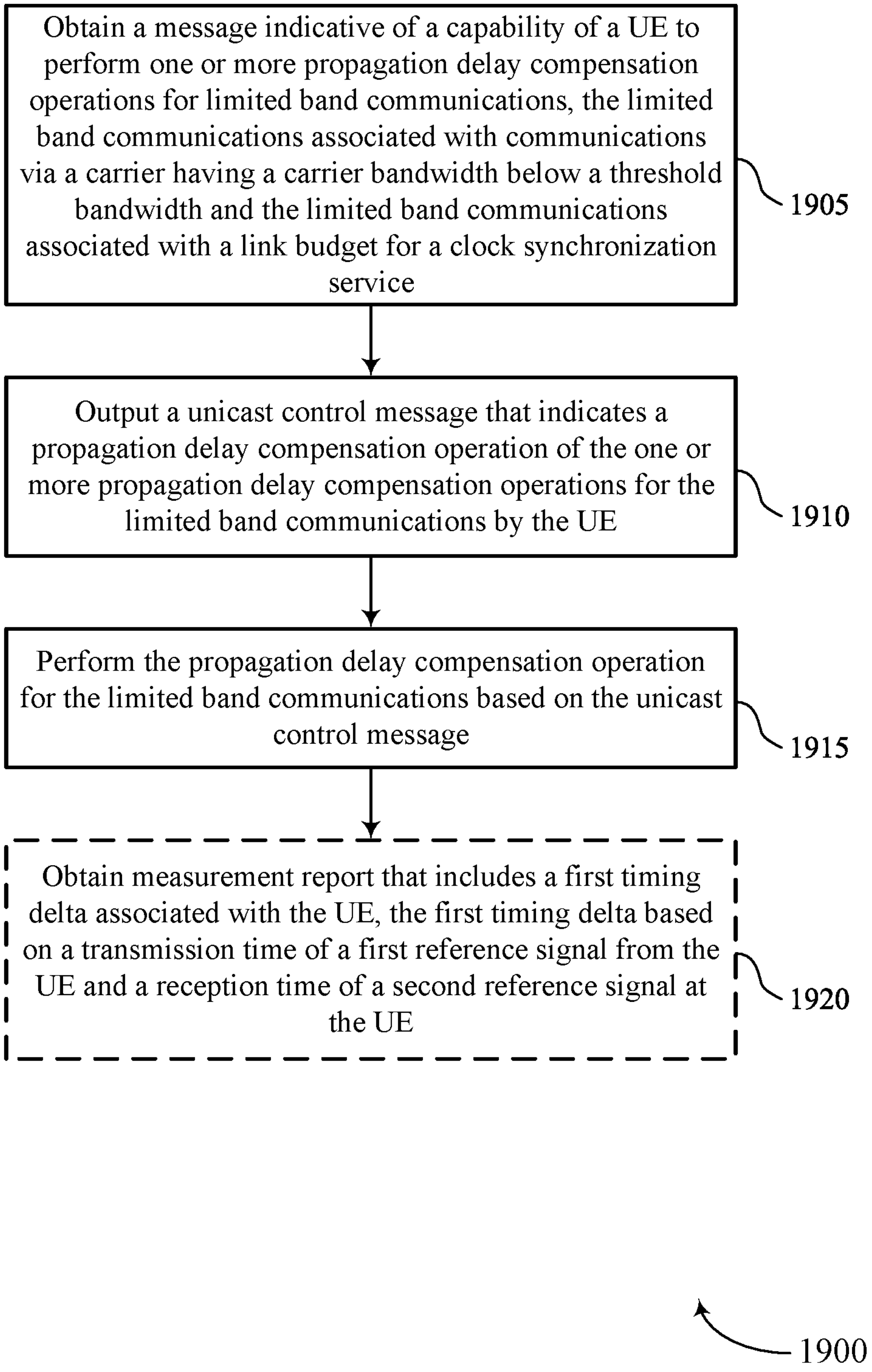

FIG. 19 shows a flowchart illustrating a method 1900 that supports PDC for limited band communications in accordance with aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the wireless network entity to perform the described functions. Additionally, or alternatively, the wireless network entity may perform aspects of the described functions using special-purpose hardware.

At 1905, the method may include obtaining a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service. The operations of 1905 may be performed in accordance with examples as disclosed herein. In some examples, aspects of the operations of 1905 may be performed by a UE capability component 1425 as described with reference to FIG. 14.

At 1910, the method may include outputting a unicast control message that indicates a PDC operation of the one or more PDC operations for the limited band communications by the UE. The operations of 1910 may be performed in accordance with examples as disclosed herein. In some examples, aspects of the operations of 1910 may be performed by a unicast RRC messaging component 1430 as described with reference to FIG. 14.

At 1915, the method may include performing the PDC operation for the limited band communications based on the unicast control message. The operations of 1915 may be performed in accordance with examples as disclosed herein. In some examples, aspects of the operations of 1915 may be performed by a PDC operation component 1435 as described with reference to FIG. 14.

At 1920, the method may include obtaining measurement report that includes a first timing delta associated with the UE, the first timing delta based on a transmission time of a first reference signal from the UE and a reception time of a second reference signal at the UE. The operations of 1920 may be performed in accordance with examples as disclosed herein. In some examples, aspects of the operations of 1920 may be performed by a UE timing delta component 1465 as described with reference to FIG. 14.

The following provides an overview of aspects of the present disclosure:

Aspect 1: An apparatus for wireless communications at a UE, comprising at least one processor; and at least one memory coupled with the at least one processor, the at least one processor configured to transmit a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service; receive a unicast control message that indicates a PDC operation of the one or more PDC operations for the limited band communications by the UE; and perform the PDC operation for the limited band communications based at least in part on the unicast control message.

Aspect 2: The apparatus of aspect 1, wherein the processor is further configured to: receive, as part of the unicast control message, time reference information associated with the one or more PDC operations, the PDC operation performed based at least in part on the time reference information.

Aspect 3: The apparatus of any of aspects 1 through 2, wherein the at least one processor is further configured to: receive, via a SIB message, time reference information associated with the one or more PDC operations, the PDC operation performed based at least in part on the time reference information.

Aspect 4: The apparatus of aspect 3, wherein the at least one processor is further configured to: receive, as part of the unicast control message, an indication to receive the time reference information via the SIB message, the time reference information via the SIB message received in accordance with the indication.

Aspect 5: The apparatus of any of aspects 1 through 4, wherein the at least one processor is further configured to: receive, as part of the unicast control message, a TA indication associated with the PDC operation, the PDC operation performed based at least in part on the TA indication.

Aspect 6: The apparatus of any of aspects 1 through 5, wherein the at least one processor is further configured to: receive a MAC-CE indicative of a TA indication, a size of the MAC-CE being greater than a threshold quantity of bits, the PDC operation performed based at least in part on the TA indication.

Aspect 7: The apparatus of any of aspects 1 through 6, wherein the at least one processor is further configured to: receive, as part of the unicast control message, a timing delta associated with a network entity, the PDC operation performed based at least in part on the timing delta associated with the network entity.

Aspect 8: The apparatus of any of aspects 1 through 7, wherein the PDC operation wherein the at least one processor is further configured to: measure a first timing delta associated with the UE, the first timing delta based at least in part on a transmission time of a first reference signal from the UE and a reception time of a second reference signal at the UE.

Aspect 9: The apparatus of aspect 8, wherein the first reference signal is one of a SRS or a PRACH signal and the second reference signal is one of a CRS or a PRS, the first reference signal is based on a mode of operation at the UE.

Aspect 10: The apparatus of any of aspects 8 through 9, wherein the first reference signal is a NPRACH signal and the second reference signal is one of a NPRS or a NRS.

Aspect 11: The apparatus of any of aspects 8 through 10, wherein the at least one processor is further configured to: receive a measurement configuration indicative of one or more resources for the second reference signal, the second reference signal being for measurement of the first timing delta associated with the UE.

Aspect 12: The apparatus of any of aspects 8 through 11, wherein the at least one processor is further configured to: transmit a measurement report that includes the first timing delta associated with the UE, the PDC operation performed based on transmission of the measurement report.

Aspect 13: The apparatus of aspect 12, wherein the at least one processor is further configured to: receive a second unicast control message that indicates a periodicity associated with transmission of the measurement report, the measurement report transmitted in accordance with the periodicity.

Aspect 14: The apparatus of any of aspects 12 through 13, wherein the at least one processor is further configured to: receive a second unicast control message that indicates a configuration associated with a semi-persistent transmission of the measurement report; and receiving a MAC-CE that activates or deactivates the semi-persistent transmission of the measurement report in accordance with the configuration.

Aspect 15: The apparatus of any of aspects 12 through 14, wherein the at least one processor is further configured to: receive DCI that triggers the UE to transmit the measurement report, the measurement report transmitted in response to reception of the DCI.

Aspect 16: The apparatus of any of aspects 12 through 15, wherein the at least one processor is further configured to: receive a report configuration that indicates a timing delta threshold, the measurement report transmitted in response to satisfaction of the timing delta threshold by the first timing delta associated with the UE.

Aspect 17: The apparatus of any of aspects 12 through 16, wherein the measurement report is in response to a difference between the first timing delta associated with the UE and a second timing delta associated with the UE satisfying a threshold, the second timing delta is measured prior to the first timing delta.

Aspect 18: The apparatus of any of aspects 1 through 17, wherein the one or more PDC operations to comprise a TA based operation, a RTT based operation, or both.

Aspect 19: The apparatus of any of aspects 1 through 18, wherein the limited band communications to comprise one of MTC or NB-IoT communications.

Aspect 20: The apparatus of any of aspects 1 through 19, wherein the one or more PDC operations are separately configured for a TN and a NTN.

Aspect 21: An apparatus for wireless communications at least one processor; and at least one memory coupled with the at least one processor, the at least one processor configured to obtain a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service; output a unicast control message that indicates a PDC operation of the one or more PDC operations for the limited band communications by the UE; and perform the PDC operation for the limited band communications based at least in part on the unicast control message.

Aspect 22: The apparatus of aspect 21, wherein the at least one processor is further configured to: output, as part of the unicast control message, time reference information associated with the one or more PDC operations, the PDC operation performed based at least in part on the time reference information.

Aspect 23: The apparatus of any of aspects 21 through 22, wherein the at least one processor is further configured to: output, via a SIB message, time reference information associated with the one or more PDC operations, the PDC operation performed based at least in part on the time reference information.

Aspect 24: The apparatus of aspect 23, wherein the at least one processor is further configured to: output, as part of the unicast control message, an indication to receive the time reference information via the SIB message, reception of the time reference information via the SIB message is in accordance with the indication.

Aspect 25: The apparatus of any of aspects 21 through 24, wherein the at least one processor is further configured to: output, as part of the unicast control message, a TA indication associated with the PDC operation, the PDC operation performed based at least in part on the TA indication.

Aspect 26: The apparatus of any of aspects 21 through 25, wherein the at least one processor is further configured to: output a MAC-CE indicative of a TA indication, a size of the MAC-CE being greater than a threshold quantity of bits, the PDC operation performed based at least in part on the TA indication.

Aspect 27: The apparatus of any of aspects 21 through 26, wherein the at least one processor is further configured to: output, as part of the unicast control message, a timing delta associated with the network entity, the PDC operation performed based at least in part on the timing delta associated with the network entity.

Aspect 28: The apparatus of any of aspects 21 through 27, wherein the PDC operation wherein the at least one processor is further configured to: obtain measurement report that includes a first timing delta associated with the UE, the first timing delta based at least in part on a transmission time of a first reference signal from the UE and a reception time of a second reference signal at the UE.

Aspect 29: The apparatus of aspect 28, wherein the first reference signal is one of a SRS or a PRACH signal and the second reference signal is one of a CRS or a PRS, the first reference signal is based on a mode of operation at the UE.

Aspect 30: The apparatus of any of aspects 28 through 29, wherein the first reference signal is a NPRACH signal and the second reference signal is one of a NPRS or a NRS.

Aspect 31: The apparatus of any of aspects 28 through 30, wherein the at least one processor is further configured to: output a measurement configuration indicative of one or more resources for the second reference signal, the second reference signal being for measurement of the first timing delta associated with the UE.

Aspect 32: The apparatus of any of aspects 28 through 31, wherein the at least one processor is further configured to: output a second unicast control message that indicates a periodicity associated with transmission of the measurement report at the UE, the measurement report obtained in accordance with the periodicity.

Aspect 33: The apparatus of any of aspects 28 through 32, wherein the at least one processor is further configured to: output a second unicast control message that indicates a configuration associated with a semi-persistent transmission of the measurement report; and output a MAC-CE that activates or deactivates the semi-persistent transmission of the measurement report in accordance with the configuration.

Aspect 34: The apparatus of any of aspects 28 through 33, wherein the at least one processor is further configured to: output DCI that triggers the UE to transmit the measurement report, the measurement report obtained in response to output of the DCI.

Aspect 35: The apparatus of any of aspects 28 through 34, wherein the at least one processor is further configured to: output a report configuration that indicates a timing delta threshold, the measurement report obtained in response to satisfaction of the timing delta threshold by the first timing delta associated with the UE.

Aspect 36: The apparatus of any of aspects 28 through 35, wherein the measurement report is in response to a difference between the first timing delta associated with the UE and a second timing delta associated with the UE satisfying a threshold, the second timing delta measured prior to the first timing delta associated with the UE.

Aspect 37: The apparatus of any of aspects 21 through 36, wherein the one or more PDC operations to comprise a TA based operation, a RTT based operation, or both.

Aspect 38: The apparatus of any of aspects 21 through 37, wherein the limited band communications to comprise one of MTC or NB-IoT communications.

Aspect 39: The apparatus of any of aspects 21 through 38, wherein the one or more PDC operations are separately configured for a TN and a NTN.

Aspect 40: A method for wireless communications at a UE, comprising: transmitting a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service; receiving a unicast control message that indicates a PDC operation of the one or more PDC operations for the limited band communications by the UE; and performing the PDC operation for the limited band communications based at least in part on the unicast control message.

Aspect 41: The method of aspect 40, further comprising: receiving, as part of the unicast control message, time reference information associated with the one or more PDC operations, the PDC operation performed based at least in part on the time reference information.

Aspect 42: The method of any of aspects 40 through 41, further comprising: receiving, via a SIB message, time reference information associated with the one or more PDC operations, the PDC operation performed based at least in part on the time reference information.

Aspect 43: The method of aspect 42, further comprising: receiving, as part of the unicast control message, an indication to receive the time reference information via the SIB message, the time reference information via the SIB message received in accordance with the indication.

Aspect 44: The method of any of aspects 40 through 43, further comprising: receiving, as part of the unicast control message, a TA indication associated with the PDC operation, the PDC operation performed based at least in part on the TA indication.

Aspect 45: The method of any of aspects 40 through 44, further comprising: receiving a MAC-CE indicative of a TA indication, a size of the MAC-CE being greater than a threshold quantity of bits, the PDC operation performed based at least in part on the TA indication.

Aspect 46: The method of any of aspects 40 through 45, further comprising: receiving, as part of the unicast control message, a timing delta associated with a network entity, the PDC operation performed based at least in part on the timing delta associated with the network entity.

Aspect 47: The method of any of aspects 40 through 46, wherein the PDC operation further comprising: measuring a first timing delta associated with the UE, the first timing delta based at least in part on a transmission time of a first reference signal from the UE and a reception time of a second reference signal at the UE.

Aspect 48: The method of aspect 47, wherein the first reference signal is one of a SRS or a PRACH signal and the second reference signal is one of a CRS or a PRS, the first reference signal is based on a mode of operation at the UE.

Aspect 49: The method of any of aspects 47 through 48, wherein the first reference signal is a NPRACH signal and the second reference signal is one of a NPRS or a NRS.

Aspect 50: The method of any of aspects 47 through 49, further comprising: receiving a measurement configuration indicative of one or more resources for the second reference signal, the second reference signal being for measurement of the first timing delta associated with the UE.

Aspect 51: The method of any of aspects 47 through 50, further comprising: transmitting a measurement report that includes the first timing delta associated with the UE, the PDC operation performed based on transmission of the measurement report.

Aspect 52: The method of aspect 51, further comprising: receiving a second unicast control message that indicates a periodicity associated with transmission of the measurement report, the measurement report transmitted in accordance with the periodicity.

Aspect 53: The method of any of aspects 51 through 52, further comprising: receiving a second unicast control message that indicates a configuration associated with a semi-persistent transmission of the measurement report; and receiving a MAC-CE that activates or deactivates the semi-persistent transmission of the measurement report in accordance with the configuration.

Aspect 54: The method of any of aspects 51 through 53, further comprising: receiving DCI that triggers the UE to transmit the measurement report, the measurement report transmitted in response to reception of the DCI.

Aspect 55: The method of any of aspects 51 through 54, further comprising: receiving a report configuration that indicates a timing delta threshold, the measurement report transmitted in response to satisfaction of the timing delta threshold by the first timing delta associated with the UE.

Aspect 56: The method of any of aspects 51 through 55, wherein the measurement report is in response to a difference between the first timing delta associated with the UE and a second timing delta associated with the UE satisfying a threshold, the second timing delta is measured prior to the first timing delta.

Aspect 57: The method of any of aspects 40 through 56, wherein the one or more PDC operations to comprise a TA based operation, a RTT based operation, or both.

Aspect 58: The method of any of aspects 40 through 57, wherein the limited band communications to comprise one of MTC or NB-IoT communications.

Aspect 59: The method of any of aspects 40 through 58, wherein the one or more PDC operations are separately configured for a TN and a NTN.

Aspect 60: A method for wireless communications at a network entity, comprising: obtaining a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service; outputting a unicast control message that indicates a PDC operation of the one or more PDC operations for the limited band communications by the UE; and performing the PDC operation for the limited band communications based at least in part on the unicast control message.

Aspect 61: The method of aspect 60, further comprising: outputting, as part of the unicast control message, time reference information associated with the one or more PDC operations, the PDC operation performed based at least in part on the time reference information.

Aspect 62: The method of any of aspects 60 through 61, further comprising: outputting, via a SIB message, time reference information associated with the one or more PDC operations, the PDC operation performed based at least in part on the time reference information.

Aspect 63: The method of aspect 62, further comprising: outputting, as part of the unicast control message, an indication to receive the time reference information via the SIB message, reception of the time reference information via the SIB message is in accordance with the indication.

Aspect 64: The method of any of aspects 60 through 63, further comprising: outputting, as part of the unicast control message, a TA indication associated with the PDC operation, the PDC operation performed based at least in part on the TA indication.

Aspect 65: The method of any of aspects 60 through 64, further comprising: outputting a MAC-CE indicative of a TA indication, a size of the MAC-CE being greater than a threshold quantity of bits, the PDC operation performed based at least in part on the TA indication.

Aspect 66: The method of any of aspects 60 through 65, further comprising: outputting, as part of the unicast control message, a timing delta associated with the network entity, the PDC operation performed based at least in part on the timing delta associated with the network entity.

Aspect 67: The method of any of aspects 60 through 66, wherein the PDC operation further comprising: obtaining measurement report that includes a first timing delta associated with the UE, the first timing delta based at least in part on a transmission time of a first reference signal from the UE and a reception time of a second reference signal at the UE.

Aspect 68: The method of aspect 67, wherein the first reference signal is one of a SRS or a PRACH signal and the second reference signal is one of a CRS or a PRS, the first reference signal is based on a mode of operation at the UE.

Aspect 69: The method of any of aspects 67 through 68, wherein the first reference signal is a NPRACH signal and the second reference signal is one of a NPRS or a NRS.

Aspect 70: The method of any of aspects 67 through 69, further comprising: outputting a measurement configuration indicative of one or more resources for the second reference signal, the second reference signal being for measurement of the first timing delta associated with the UE.

Aspect 71: The method of any of aspects 67 through 70, further comprising: outputting a second unicast control message that indicates a periodicity associated with transmission of the measurement report at the UE, the measurement report obtained in accordance with the periodicity.

Aspect 72: The method of any of aspects 67 through 71, further comprising: outputting a second unicast control message that indicates a configuration associated with a semi-persistent transmission of the measurement report; and outputting a MAC-CE that activates or deactivates the semi-persistent transmission of the measurement report in accordance with the configuration.

Aspect 73: The method of any of aspects 67 through 72, further comprising: outputting DCI that triggers the UE to transmit the measurement report, the measurement report obtained in response to output of the DCI.

Aspect 74: The method of any of aspects 67 through 73, further comprising: outputting a report configuration that indicates a timing delta threshold, the measurement report obtained in response to satisfaction of the timing delta threshold by the first timing delta associated with the UE.

Aspect 75: The method of any of aspects 67 through 74, wherein the measurement report is in response to a difference between the first timing delta associated with the UE and a second timing delta associated with the UE satisfying a threshold, the second timing delta measured prior to the first timing delta associated with the UE.

Aspect 76: The method of any of aspects 60 through 75, wherein the one or more PDC operations to comprise a TA based operation, a RTT based operation, or both.

Aspect 77: The method of any of aspects 60 through 76, wherein the limited band communications to comprise one of MTC or NB-IoT communications.

Aspect 78: The method of any of aspects 60 through 77, wherein the one or more PDC operations are separately configured for a TN and a NTN.

Aspect 79: An apparatus for wireless communications at a UE, comprising at least one means for performing a method of any of aspects 40 through 59.

Aspect 80: A non-transitory computer-readable medium storing code for wireless communications at a UE, the code comprising instructions executable by at least one processor to perform a method of any of aspects 40 through 59.

Aspect 81: An apparatus for wireless communications at a network entity, comprising at least one means for performing a method of any of aspects 60 through 78.

Aspect 82: A non-transitory computer-readable medium storing code for wireless communications at a network entity, the code comprising instructions executable by at least one processor to perform a method of any of aspects 60 through 78.

Aspect 83: An apparatus for wireless communications at a UE, comprising one or more memories; and one or more processors coupled with the one or more memories and individually or collectively configured to transmit a message indicative of a capability of the UE to perform one or more PDC operations for limited band communications, the limited band communications associated with communications via a carrier having a carrier bandwidth below a threshold bandwidth, the limited band communications associated with a link budget for a clock synchronization service; receive a unicast control message that indicates a PDC operation of the one or more PDC operations for the limited band communications by the UE; and perform the PDC operation for the limited band communications based at least in part on the unicast control message.

Aspect 84: An apparatus for wireless communications one or more memories; and one or more processors coupled with the one or more memories and individually or collectively configured to obtain a message indicative of a capability of a UE to perform one or more PDC operations for limited band communications, the limited band communications associated with communications via a carrier having a carrier bandwidth below a threshold bandwidth and the limited band communications associated with a link budget for a clock synchronization service; output a unicast control message that indicates a PDC operation of the one or more PDC operations for the limited band communications by the UE; and perform the PDC operation for the limited band communications based at least in part on the unicast control message.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by at least one processor, firmware, or any combination thereof. If implemented using software executed by at least one processor, the functions may be stored as or transmitted using one or more instructions or code of a computer-readable medium. Other examples and implementations are within the scope of the disclosure and appended claims. For example, due to the nature of software, functions described herein may be implemented using software executed by at least one processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
- one or more memories; and
- one or more processors coupled with the one or more memories and configured to cause the UE to:
  - transmit a message indicative of a capability of the UE to perform one or more propagation delay compensation operations for limited band communications, the limited band communications associated with communications via a carrier having a carrier bandwidth below a threshold bandwidth and associated with a link budget for a clock synchronization service, wherein the link budget comprises one or more timing targets for one or more uplink transmissions associated with the clock synchronization service via the limited band communications;
  - receive a unicast control message that indicates a propagation delay compensation operation of the one or more propagation delay compensation operations for the limited band communications by the UE; and
  - perform the propagation delay compensation operation for the limited band communications based at least in part on the unicast control message.

2. The apparatus of claim 1, wherein the one or more processors are further configured to cause the UE to:
- receive, as part of the unicast control message, time reference information associated with the one or more propagation delay compensation operations, wherein the propagation delay compensation operation is performed based at least in part on the time reference information.

3. The apparatus of claim 1, wherein the one or more processors are further configured to cause the UE to:
- receive, via a system information block message, time reference information associated with the one or more propagation delay compensation operations, wherein the propagation delay compensation operation is performed based at least in part on the time reference information.

4. The apparatus of claim 3, wherein the one or more processors are further configured to cause the UE to:
- receive, as part of the unicast control message, an indication to receive the time reference information via the system information block message, wherein the time reference information via the system information block message is received in accordance with the indication.

5. The apparatus of claim 1, wherein the one or more processors are further configured to cause the UE to:
- receive, as part of the unicast control message, a timing advance indication associated with the propagation delay compensation operation, wherein the propagation delay compensation operation is performed based at least in part on the timing advance indication.

6. The apparatus of claim 1, wherein the one or more processors are further configured to cause the UE to:
- receive a medium access control-control element (MAC-CE) indicative of a timing advance indication, wherein a size of the MAC-CE is greater than a threshold quantity of bits, and wherein the propagation delay compensation operation is performed based at least in part on the timing advance indication.

7. The apparatus of claim 1, wherein the one or more processors are further configured to cause the UE to:
- receive, as part of the unicast control message, a timing delta associated with a network entity, wherein the propagation delay compensation operation is performed based at least in part on the timing delta associated with the network entity.

8. The apparatus of claim 1, wherein, to perform the propagation delay compensation operation, the one or more processors are processor is configured to cause the UE to:
- measure a first timing delta associated with the UE, wherein the first timing delta is based at least in part on a transmission time of a first reference signal from the UE and a reception time of a second reference signal at the UE.

9. The apparatus of claim 8, wherein the first reference signal is one of a sounding reference signal or a physical random access channel signal and wherein the second reference signal is one of a cell-specific reference signal or a positioning reference signal, and wherein the first reference signal is based on a mode of operation at the UE.

10. The apparatus of claim 8, wherein the first reference signal is a narrow band physical random access channel signal and wherein the second reference signal is one of a narrow band positioning reference signal or a narrow band reference signal.

11. The apparatus of claim 8, wherein the one or more processors are further configured to cause the UE to:
- receive a measurement configuration indicative of one or more resources for the second reference signal, wherein the second reference signal is for measurement of the first timing delta associated with the UE.

12. The apparatus of claim 8, wherein the one or more processors are further configured to cause the UE to:
- transmit a measurement report that includes the first timing delta associated with the UE, wherein the propagation delay compensation operation is performed based on transmission of the measurement report.

13. The apparatus of claim 12, wherein the one or more processors are further configured to cause the UE to:
- receive a second unicast control message that indicates a periodicity associated with transmission of the measurement report, wherein the measurement report is transmitted in accordance with the periodicity.

14. The apparatus of claim 12, wherein the one or more processors are further configured to cause the UE to:
- receive a second unicast control message that indicates a configuration associated with a semi-persistent transmission of the measurement report; and receive a MAC-CE that activates or deactivates the semi-persistent transmission of the measurement report in accordance with the configuration.

15. The apparatus of claim 12, wherein the one or more processors are further configured to cause the UE to:

receive downlink control information that triggers the UE to transmit the measurement report, wherein the measurement report is transmitted in response to reception of the downlink control information.

16. The apparatus of claim 12, further comprising one or more antennas, wherein the one or more processors and the one or more antennas of the apparatus are further configured to cause the UE to:

receive, via the one or more antennas configured to receive one or more downlink messages, a report configuration that indicates a timing delta threshold, wherein the measurement report is transmitted in response to satisfaction of the timing delta threshold by the first timing delta associated with the UE.

17. The apparatus of claim 12, wherein the measurement report is in response to satisfaction of a threshold by a difference between the first timing delta associated with the UE and a second timing delta associated with the UE, and wherein the second timing delta is measured prior to the first timing delta.

18. The apparatus of claim 1, wherein the one or more propagation delay compensation operations comprise a timing advance based operation, a round trip time based operation, or both.

19. The apparatus of claim 1, wherein the limited band communications comprise one of machine type communications or narrow band internet of things communications.

20. The apparatus of claim 1, wherein the one or more propagation delay compensation operations are separately configured for a terrestrial network and a non-terrestrial network.

21. An apparatus for wireless communications at a network entity, comprising:

one or more memories; and one or more processors coupled with the one or more memories and configured to cause the network entity to:

obtain a message indicative of a capability of a user equipment (UE) to perform one or more propagation delay compensation operations for limited band communications, the limited band communications associated with communications via a carrier having a carrier bandwidth below a threshold bandwidth and associated with a link budget for a clock synchronization service, wherein the link budget comprises one or more timing targets for one or more uplink transmissions associated with the clock synchronization service via the limited band communications;

output a unicast control message that indicates a propagation delay compensation operation of the one or more propagation delay compensation operations for the limited band communications; and perform the propagation delay compensation operation for the limited band communications based at least in part on the unicast control message.

22. The apparatus of claim 21, wherein the one or more processors are further configured to cause the network entity to:

output, as part of the unicast control message, time reference information associated with the one or more propagation delay compensation operations, wherein the propagation delay compensation operation is performed based at least in part on the time reference information.

23. The apparatus of claim 21, wherein the one or more processors are further configured to cause the network entity to:

output, via a system information block message, time reference information associated with the one or more propagation delay compensation operations, wherein the propagation delay compensation operation is performed based at least in part on the time reference information.

24. The apparatus of claim 23, wherein the one or more processors are further configured to cause the network entity to:

output, as part of the unicast control message, an indication to receive the time reference information via the system information block message, wherein reception of the time reference information via the system information block message is in accordance with the indication.

25. The apparatus of claim 21, wherein the one or more processors are further configured to cause the network entity to:

output, as part of the unicast control message, a timing advance indication associated with the propagation delay compensation operation, wherein the propagation delay compensation operation is performed based at least in part on the timing advance indication.

26. The apparatus of claim 21, wherein the one or more processors are at least one processor is further configured to cause the network entity to:

output a MAC-CE indicative of a timing advance indication, wherein a size of the MAC-CE is greater than a threshold quantity of bits, and wherein the propagation delay compensation operation is performed based at least in part on the timing advance indication.

27. The apparatus of claim 21, wherein the one or more processors are further configured to cause the network entity to:

output, as part of the unicast control message, a timing delta associated with the network entity, wherein the propagation delay compensation operation is performed based at least in part on the timing delta associated with the network entity.

28. The apparatus of claim 21, wherein the one or more processors are further configured to cause the network entity to:

obtain measurement report that includes a first timing delta associated with the UE, the first timing delta based at least in part on a transmission time of a first reference signal from the UE and a reception time of a second reference signal at the UE.

29. A method for wireless communications at a user equipment (UE), comprising:

transmitting a message indicative of a capability of the UE to perform one or more propagation delay compensation operations for limited band communications, the limited band communications associated with communications via a carrier having a carrier bandwidth below a threshold bandwidth and associated with a link budget for a clock synchronization service, the link budget comprising one or more timing targets for one or more uplink transmissions associated with the clock synchronization service via the limited band communications;

receiving a unicast control message that indicates a propagation delay compensation operation of the one or more propagation delay compensation operations for the limited band communications by the UE; and performing the propagation delay compensation operation for the limited band communications based at least in part on the unicast control message.

30. The method of claim 29, further comprising:

receiving, as part of the unicast control message, time reference information associated with the one or more propagation delay compensation operations, the propagation delay compensation operation performed based at least in part on the time reference information.

31. The method of claim 29, further comprising:

receiving, via a system information block message, time reference information associated with the one or more propagation delay compensation operations, the propagation delay compensation operation performed based at least in part on the time reference information.

32. The method of claim 31, further comprising:

receiving, as part of the unicast control message, an indication to receive the time reference information via the system information block message, the time reference information via the system information block message received in accordance with the indication.

33. A method for wireless communications at a network entity, comprising:

obtaining a message indicative of a capability of a user equipment (UE) to perform one or more propagation delay compensation operations for limited band communications, the limited band communications associated with communications via a carrier having a carrier bandwidth below a threshold bandwidth and associated with a link budget for a clock synchronization service, the link budget comprising one or more timing targets for one or more uplink transmissions associated with the clock synchronization service via the limited band communications;

outputting a unicast control message that indicates a propagation delay compensation operation of the one or more propagation delay compensation operations for the limited band communications; and performing the propagation delay compensation operation for the limited band communications based at least in part on the unicast control message.

34. The method of claim 33, further comprising:

outputting, as part of the unicast control message, time reference information associated with the one or more propagation delay compensation operations, the propagation delay compensation operation performed based at least in part on the time reference information.

35. The method of claim 33, further comprising:

outputting, via a system information block message, time reference information associated with the one or more propagation delay compensation operations, the propagation delay compensation operation performed based at least in part on the time reference information.

36. The method of claim 35, further comprising:

outputting, as part of the unicast control message, an indication to receive the time reference information via the system information block message, wherein reception of the time reference information via the system information block message is in accordance with the indication.

37. A non-transitory computer-readable medium storing code for wireless communications at a user equipment (UE), the code comprising instructions executable by one or more processors to cause the UE to:

transmit a message indicative of a capability of the UE to perform one or more propagation delay compensation operations for limited band communications, the limited band communications associated with communications via a carrier having a carrier bandwidth below a threshold bandwidth and associated with a link budget for a clock synchronization service, wherein the link budget comprises one or more timing targets for one or more uplink transmissions associated with the clock synchronization service via the limited band communications;

receive a unicast control message that indicates a propagation delay compensation operation of the one or more propagation delay compensation operations for the limited band communications by the UE; and perform the propagation delay compensation operation for the limited band communications based at least in part on the unicast control message.

38. A non-transitory computer-readable medium storing code for wireless communications at a network entity, the code comprising instructions executable by one or more processors to cause the network entity to:

obtain a message indicative of a capability of a user equipment (UE) to perform one or more propagation delay compensation operations for limited band communications, the limited band communications associated with communications via a carrier having a carrier bandwidth below a threshold bandwidth and associated with a link budget for a clock synchronization service, wherein the link budget comprises one or more timing targets for one or more uplink transmissions associated with the clock synchronization service via the limited band communications;

output a unicast control message that indicates a propagation delay compensation operation of the one or more propagation delay compensation operations for the limited band communications; and perform the propagation delay compensation operation for the limited band communications based at least in part on the unicast control message.

* * * * *